(12) United States Patent
Zhu

(10) Patent No.: US 11,472,153 B2
(45) Date of Patent: Oct. 18, 2022

(54) CONTINUOUS HONEYCOMB CORE MATERIAL, HONEYCOMB CORE SANDWICH COMPOSITE PANEL AND METHOD AND DEVICE FOR PREPARING SAME

(71) Applicant: JIANGSU QIYI TECHNOLOGY CO., LTD, Jiangsu (CN)

(72) Inventor: Huaping Zhu, Jiangsu (CN)

(73) Assignee: JIANGSU QIYI TECHNOLOGY CO., LTD, Danyang (CN)

( * ) Notice: Subject to any disclaimer, the term of this patent is extended or adjusted under 35 U.S.C. 154(b) by 0 days.

(21) Appl. No.: 17/477,317

(22) Filed: Sep. 16, 2021

(65) Prior Publication Data

US 2022/0001643 A1 Jan. 6, 2022

Related U.S. Application Data

(63) Continuation of application No. PCT/CN2020/075505, filed on Feb. 17, 2020.

(30) Foreign Application Priority Data

Jan. 21, 2020 (CN) .......................... 202010069763.7

(51) Int. Cl.
*B32B 3/06* (2006.01)
*B29D 99/00* (2010.01)
(Continued)

(52) U.S. Cl.
CPC ............ *B32B 3/06* (2013.01); *B29D 99/0089* (2013.01); *B32B 3/12* (2013.01); *B32B 7/12* (2013.01);
(Continued)

(58) Field of Classification Search
CPC ............ Y10T 428/234; Y10T 428/236; Y10T 428/24149; Y10T 428/24165;
(Continued)

(56) References Cited

U.S. PATENT DOCUMENTS 8,303,744 B2   11/2012   Bradford
8,663,523 B2   3/2014    Bradford et al.
(Continued)

FOREIGN PATENT DOCUMENTS

CN   202612294 U   12/2012
CN   101084108 B    1/2013
(Continued)

OTHER PUBLICATIONS

Machine translation (Espacenet) of CN 108773112 A. Translated Apr. 14, 2022. (Year: 2022).*
(Continued)

*Primary Examiner* — Prashant J Khatri
*Assistant Examiner* — Ethan A. Utt
(74) *Attorney, Agent, or Firm* — Wayne IP LLC

(57) ABSTRACT

A continuous honeycomb core material, a honeycomb core sandwich composite panel and a method and a device for preparing the same. The continuous honeycomb core material includes a honeycomb-core material, which includes a plurality of cells arranged in rows, and transversely adjacent cells are connected via transversely arranged connecting walls. The sidewalls of longitudinally adjacent cells are bonded via the adhesive layer. A connecting structure is arranged between two adjacent honeycomb core materials. The connecting structure includes a first connecting portion and a second connecting portion corresponding thereto. The first and second connecting portions are respectively arranged on different transverse sides of the honeycomb core material. A first connecting portion of one continuous hon-
(Continued)

eycomb core material section is engaged with a second connection portion of another continuous honeycomb core material section are connected to form the connecting structure.

14 Claims, 14 Drawing Sheets

(51) Int. Cl.
    *B32B 3/12*         (2006.01)
    *B32B 7/12*         (2006.01)
    *B32B 27/08*       (2006.01)
    *B32B 37/10*       (2006.01)
    *B32B 37/12*       (2006.01)
    *B32B 38/00*       (2006.01)

(52) U.S. Cl.
    CPC .............. *B32B 27/08* (2013.01); *B32B 37/10* (2013.01); *B32B 37/12* (2013.01); *B32B 38/0004* (2013.01); *B32B 2250/03* (2013.01); *B32B 2250/40* (2013.01); *B32B 2307/546* (2013.01)

(58) Field of Classification Search
    CPC ........... Y10T 428/24942; Y10T 428/19; Y10T 428/192; Y10T 428/24777; Y10T 428/24785; B32B 3/00; B32B 3/02; B32B 3/06; B32B 3/10; B32B 3/12; B32B 7/00; B32B 7/02; B32B 7/027; B32B 2305/024; B32B 2307/30
    USPC ....... 428/72, 73, 116, 118, 212, 57, 58, 192, 428/193
    See application file for complete search history.

(56) References Cited

U.S. PATENT DOCUMENTS

| | | | |
|---|---|---|---|
| 9,550,336 | B2 | 1/2017 | Bradford |
| 2008/0047121 | A1* | 2/2008 | Douglas .................... B32B 3/18 428/116 |
| 2011/0008566 | A1* | 1/2011 | Okano .................. B32B 27/281 428/58 |
| 2015/0174717 | A1* | 6/2015 | Hethcock ........... B29D 99/0089 29/559 |
| 2015/0174819 | A1* | 6/2015 | Hethcock .............. B29C 65/785 156/272.2 |
| 2015/0174876 | A1* | 6/2015 | Hethcock ........... B29D 99/0089 156/185 |

FOREIGN PATENT DOCUMENTS

| | | | | |
|---|---|---|---|---|
| CN | 102847560 A | | 1/2013 | |
| CN | 103589349 A | | 2/2014 | |
| CN | 104205208 A | | 12/2014 | |
| CN | 104228154 A | | 12/2014 | |
| CN | 105835484 A | | 8/2016 | |
| CN | 205781947 U | | 12/2016 | |
| CN | 107639884 A | * | 1/2018 | |
| CN | 107639884 A | | 1/2018 | |
| CN | 108773112 A | * | 11/2018 | .............. B32B 3/12 |
| CN | 108773112 A | | 11/2018 | |
| CN | 110315805 A | | 10/2019 | |
| CN | 110613510 B | | 7/2020 | |
| JP | 2014008735 A | | 1/2014 | |
| JP | 2018122444 A | * | 8/2018 | |

OTHER PUBLICATIONS

Machine translation (Espacenet) of CN 107639884 A. Translated Apr. 14, 2022. (Year: 2022).*
Machine translation (Espacenet) of JP 2018-122444 A. Translated Apr. 14, 2022. (Year: 2022).*

* cited by examiner

Processing a first thermoplastic resin film via a thermal molding process or a vacuum plastic-absorbing thermoforming process to obtain a sheet structure, wherein the sheet structure is continuous along a longitudinal direction and is formed by a plurality of semi-hexagonal structures consecutively connected along a transverse direction; and the sheet structure comprises a plurality of semi-hexagonal units arranged spaced apart, an engagement portion between adjacent semi-hexagonal units, a first sub connecting portion and a second sub connecting portion respectively arranged on two side edges; 

Aligning and bonding engagement portions of two sheet structures via a thermal pressing process or an ultrasonic thermal welding process to form a core board, wherein the core board is continuous along a longitudinal direction and is formed by a plurality of hexagonal columns consecutively connected along a transverse direction, and two transverse edges of the core board are respectively provided with a first connecting portion and a second connecting portion; 

Cutting the core board up and down at intervals to form notches; wherein the notches are spaced apart up and down and are partially connected; and during the cutting, the core board is not completely cut off, and a connecting edge is retained at the notches; 

Rotating the core board with notches by positive or negative 90 degrees in a direction of the notches to fold the core board with the notches as a folding position and the connecting edge at the notches as a folding rotation axis; and heating adjacent side walls to allow the adhesive layer to be in a melted state; and bonding the adjacent side walls to form a honeycomb core; 

Transversely cutting the honeycomb core according to a preset length to prepare a plurality of honeycomb core segments with a certain width; 

Connecting at least two honeycomb core segments with a certain width via a connecting structure to form a continuous honeycomb core material with the connecting structure; heating the continuous honeycomb core material, the first panel and the second panel such that the upper and lower surfaces of the continuous honeycomb core material, the first interface layer and the second interface layer respectively reach a preset melting temperature; and subjecting the continuous honeycomb core material, the first panel and the second panel to heat-press compounding followed by cooling molding to obtain the honeycomb core sandwich composite panel. 

Fig. 30

CONTINUOUS HONEYCOMB CORE MATERIAL, HONEYCOMB CORE SANDWICH COMPOSITE PANEL AND METHOD AND DEVICE FOR PREPARING SAME

CROSS-REFERENCE TO RELATED APPLICATIONS

This application is a continuation of International Patent Application No. PCT/CN2020/075505, filed on Feb. 17, 2020, which claims the benefit of priority from Chinese Patent Application No. 202010069763.7, filed on Jan. 21, 2020. The content of the aforementioned application, including any intervening amendments thereto, is incorporated herein by reference.

TECHNICAL FIELD

This application relates to honeycomb structures, and more particularly to a continuous honeycomb core material, a honeycomb core sandwich composite panel and a method and a device for preparing the same.

BACKGROUND

A honeycomb core sandwich composite panel is prepared from an upper panel, a lower panel and a low-density honeycomb core layer sandwiched there between by the hot-pressing process, where the upper and lower panels are made of a lightweight and high-strength material. The honeycomb-core sandwich composite panel has a light weight, a large strength/weight ratio and a good compressive strength, and is thus commonly used in aramid honeycombs and aluminum honeycombs in aircraft, thermoplastic PP honeycomb sandwich composite panels in the transportation, paper honeycombs in the packaging industry and backing panels of a lightweight assembly in the photovoltaic industry.

In an economical and effective manufacturing process in the prior art, a honeycomb core which is narrow in width and continuous along a length direction is produced in a continuous production manner, and then the continuous honeycomb core is cut on line according to a preset length to obtain a batch of honeycomb cores with the same length. Those honeycomb cores with the same length are respectively rotated by 90° such that the length of the honeycomb cores forms the width of the honeycomb-core material required for the honeycomb sandwich composite panel. The honeycomb cores are sequentially spliced and then bonded to a panel by physical bonding (such as thermal lamination) or chemical bonding (such as adhesive bonding) to produce the honeycomb-core sandwich composite panel with large width and adjustable length.

Currently, several production processes of the honeycomb core materials have been disclosed in some patent literatures (Chinese Patent No. 101084108B and Chinese Patent Publication No. 105835484A owned by EconCore company (Belgium); and U.S. Pat. No. 8,303,744B2, U.S. Pat. No. 8,663,523B2 and U.S. Pat. No. 9,550,336B2 owned by Bradford Company (US)). However, these literatures fail to disclose how to achieve the effective transverse connection between adjacent honeycomb-core sections in the downstream processing to prepare the honeycomb sandwich composite panel with large width and adjustable length. The existing designs will cause crack and discontinuity in the structure when the adjacent sections of honeycomb-core materials are connected transversely, weakening the bending strength of the honeycomb-core sandwich panel along the length direction. However, the ratio of the compressive strength and the bending strength to the weight per unit area is considered as a main index to evaluate the technical performance of the honeycomb-core sandwich composite panel.

The present disclosure further improves and optimizes the structural design of honeycomb-core materials based on the content disclosed in Chinese Patent No. 201810629488.6 (owned by Jiangsu Qiyi Technology Co., Ltd), and effectively enhances the connection between the edges of adjacent honeycomb-core sections. The bending strength of the honeycomb-core sandwich composite panel is improved without changing the material and structure of the panel, and the conditions of the compound processing technology.

SUMMARY

To achieve the above object, this application provides a continuous honeycomb core material, a honeycomb core sandwich composite panel and a method and a device for preparing the same. This disclosure improves and optimizes the structure of the honeycomb core material to produce a continuous honeycomb core material with a first connection portion and a second connection portion. The continuous honeycomb core material is transversely cut online into multiple honeycomb core sections with a certain or the same length. Then the length of the honeycomb core sections is configured as the width of the honeycomb-core material required for the honeycomb-core sandwich composite panel. By means of the connecting structure, the adjacent honeycomb core sections can be effectively connected to form the continuous honeycomb core material. Subsequently, the upper and lower surfaces of the continuous honeycomb-core material are respectively bonded to two designed panels by hot-pressing to produce the honeycomb core sandwich composite panel with arbitrary width and length. The bending strength of the honeycomb core sandwich composite panel along the moving direction can be efficiently enhanced without changing the material and structure of the panel, and the conditions of the compound processing technology.

Technical solutions of this application are described as follows.

In a first aspect, this application provides a continuous honeycomb core material, comprising:

a plurality of honeycomb cores;

wherein each of the plurality honeycomb cores comprises a plurality of cells arranged in rows; each of the plurality of cells is a hexagonal column formed by side walls; each of the side wall comprises a support layer and an adhesive layer; the support layer and the adhesive layer are made of different materials, and a melting point of the adhesive layer is lower than a softening point of the support layer; adjacent cells along a transverse direction are connected by a connecting wall arranged transversely, and adjacent side walls of adjacent cells along a longitudinal direction are attached to each other through the adhesive layer;

edges of two transverse sides of each of the plurality of honeycomb cores are provided with a first connecting portion and a second portion; and the first connecting portion of one of adjacent two honeycomb cores and the second connecting portion of the other of the adjacent two honeycomb cores are connected to form a connecting structure.

In some embodiments, the first connecting portion of one of adjacent two honeycomb cores and the second connecting portion of the other of the adjacent two continuous honeycomb cores are staggeredly engaged to form a connecting structure with a quadrilateral or hexagonal cross section.

In some embodiments, the first connecting portion of one of adjacent two honeycomb cores and the second connecting portion of the other of the adjacent two honeycomb cores fit each other to form a connecting structure with a trapezoidal cross section, wherein the first connecting portion has an inward-splayed cross section, and the second connecting portion has an outward-splayed cross-section.

In some embodiments, the first connecting portion of one of adjacent two honeycomb cores and the second connecting portion of the other of the adjacent two honeycomb cores fit each other to form a connecting structure with a cross-shaped cross section, wherein the first connecting portion and the second connecting portion both have a T-shaped cross section.

In some embodiments, the first connecting portion of one of adjacent two honeycomb cores is inserted into a second connecting portion of the other of the adjacent two honeycomb cores to form a connecting structure with a quadrilateral cross section. The first connecting portion is engaged in a groove formed by the second connecting portion to enable connection between the adjacent two honeycomb cores, and the first connecting part has an inward-splayed cross section.

In some embodiments, the first connecting portion of one of adjacent two honeycomb cores is inserted into the second connecting portion of the other of the adjacent two honeycomb cores to form a connecting structure with a hexagonal cross section. The first connecting portion is engaged in a groove formed by the second connecting portion, forming a connection between the adjacent two honeycomb cores.

In some embodiments, the first connecting portion of one of adjacent two honeycomb cores is inserted into the second connecting portion of the other of the adjacent two honeycomb cores to form a connecting structure with a hexagonal cross section. The first connecting portion has a hexagonal cross section with an opening, and a cross section of the second connecting portion is Y-shaped.

In some embodiments, the first connecting portion of one of adjacent two honeycomb cores is inserted into the second connecting portion of the other of the adjacent two honeycomb cores to form a connecting structure with a pentagonal cross section. The first connecting portion has a pentagonal cross section with an opening, and a cross section of the second connecting portion is T-shaped.

In some embodiments, the first connecting portion and a second connecting portion are respectively provided with at least one barb structure. The at least one barb structure on the first connecting portion of one of adjacent two honeycomb cores and at least one barb structure of the second connecting portion of the other of the adjacent two honeycomb cores are engaged to form a connecting structure.

In some embodiments, a structure or a shape of the first connecting portion is the same as that of the second connecting portion.

In some embodiments, a structure or a shape of the first connecting portion is different from that of the second connecting portion.

In some embodiments, the side walls of each of plurality of cells have a three-layered structure consisting of the support layer and two adhesive layers, and the two adhesive layers are respectively provided at two sides of the support layer adhesive.

A second object of the present disclosure is to provide a honeycomb core sandwich composite panel, comprising:

at least two above-mentioned continuous honeycomb core materials;

a first panel arranged on an upper surface of the continuous honeycomb core material; and a second panel arranged on a lower surface of the continuous honeycomb core material;

wherein the first panel comprises a first bulk layer and a first interface layer; the first interface layer is bonded to the upper surface of the continuous honeycomb core material; the first bulk layer is arranged on the first interface layer; the second interface layer is bonded to the lower surface of the continuous honeycomb core material; the second bulk layer is arranged on the second interface layer; the first bulk layer and the second bulk layer are made of a continuous fiber-reinforced thermoplastic material; and the first interface layer and the second interface layer are made of a continuous fiber-reinforced thermoplastic material or a thermoplastic resin film.

A third object of the present disclosure is to provide a method of preparing the honeycomb core sandwich composite panel, comprising:

(S1) processing a first thermoplastic resin film via a thermal molding process or a vacuum plastic-absorbing thermoforming process to obtain a sheet structure, wherein the sheet structure is continuous along a longitudinal direction and is formed by a plurality of semi-hexagonal structures consecutively connected along a transverse direction; and the sheet structure comprises a plurality of semi-hexagonal units arranged spaced apart, an engagement portion between adjacent semi-hexagonal units, a first sub connecting portion and a second sub connecting portion respectively arranged on two side edges;

(S2) aligning and bonding engagement portions of two sheet structures via a thermal pressing process or an ultrasonic thermal welding process to form a core board, wherein the core board is continuous along a longitudinal direction and is formed by a plurality of hexagonal columns consecutively connected along a transverse direction, and two transverse edges of the core board are respectively provided with a first connecting portion and a second connecting portion;

(S3) cutting the core board up and down at intervals to form notches, wherein the notches are spaced apart up and down and are partially connected; and during the cutting, the core board is not completely cut off, and a connecting edge is retained at the notches;

(S4) rotating the core board with notches by positive or negative 90 degrees in a direction of the notches to fold the core board with the notches as a folding position and the connecting edge at the notches as a folding rotation axis; and heating adjacent side walls to allow the adhesive layer to be in a melted state; and bonding the adjacent side walls to form a continuous honeycomb core;

(S5) transversely cutting the honeycomb core according to a preset length to prepare a plurality of honeycomb core segments with a certain width; and (S6) connecting at least two honeycomb core segments with a certain width via a connecting structure to form a continuous honeycomb core with the connecting structure; heating the continuous honeycomb core material, the first panel and the second panel such that the upper and lower surfaces of the continuous honeycomb core material, the first interface layer and the second interface layer respectively reach a preset melting temperature; and subjecting the continuous honeycomb core material, the first panel and the second panel to heat-press compounding followed by cooling molding, to obtain the honeycomb core sandwich composite panel. A first connecting portion of one of adjacent two honeycomb cores and a second connecting portion of the other of the adjacent two honeycomb core can be engaged by an opposite connection, an up-and-down insertion connection, a horizontal connection or a vertical connection, but not limited to those stated herein.

In some embodiments, the first thermoplastic resin film comprises the support layer and the adhesive layer, and the support layer and the adhesive layer are made of different materials; a melting point of the adhesive layer is lower than a softening point of the support layer; an outer side of the core board in step (S2) is provided with the adhesive layer; and in step (S4), adhesive layers of the side walls of cells connected side by side after the folding are bound by hot-melting, and a heating temperature of the hot-melting is between the melting point of the adhesive layer and the softening point of the support layer.

In some embodiments, the first thermoplastic resin film has a single-layer structure; in step (S1), the first thermoplastic resin film with the single-layer structure is configured as the support layer; two layers of a second thermoplastic resin film are respectively bound to two sides of the support layer as the adhesive layer by heat-press compounding, and the melting point of the adhesive layer is lower than the softening point of the support layer; and in step (S4), adhesive layers of side walls of cells connected side by side after the folding are bound by hot-melting, and a heating temperature of the hot-melting is between the melting point of the adhesive layer and the softening point of the support layer.

In some embodiments, the first panel and the second panel have a single structure, and the step (S6) is performed through steps of:

(S61) arranging at least one layer of the continuous fiber-reinforced thermoplastic material at an outer side of the first panel as the first bulk layer; and arranging at least one layer of the continuous fiber-reinforced thermoplastic material at an outer side of the second panel as the second bulk layer; arranging one layer of hot-melting connecting film at an inner side of the first panel to form an first interface layer; and arranging one layer of hot-melting connecting film at an inner side of the second panel to form an second interface layer;

(S62) preparing the first interface layer on an inner surface of the first panel by extrusion molding or thermal lamination, and preparing the second interface layer on an inner surface of the second panel by extrusion molding or thermal lamination, wherein the first interface layer and the second interface layer are both made of a hot-melt binding film with a thickness of 0.01-0.5 mm; and (S63) connecting at least two honeycomb core segments with a certain width via a connecting structure to form a continuous honeycomb core material with the connecting structure; heating the continuous honeycomb core material, the first panel and the second panel such that the upper and lower surfaces of the continuous honeycomb core material, the first interface layer and the second interface layer respectively reach a preset melting temperature; and subjecting the continuous honeycomb core material, the first panel and the second panel to heat-press compounding followed by cooling molding to obtain the honeycomb core sandwich composite panel.

In some embodiments, the method further comprises:

(S7) binding a decorative layer to the first panel and the second panel in advance by hot-press lamination, or binding the decorative layer to upper and lower surfaces of the honeycomb core sandwich composite panel by hot press lamination; wherein the decorative layer is a second thermoplastic resin film with decorative appearance.

A fourth object of the present disclosure is to provide a device for implementing the above preparation method, comprising:
   a first conveyor belt unit;
   a thermoforming device;
   a first cutting device;
   a dividing double-roller device;
   a first cooling unit;
   a hot melting device;
   a hot-pressing laminating device;
   a first unreeling mechanism;
   a second unreeling mechanism;
   a delivery mechanism;
   a pushing mechanism; and
   a second cutting device;
   wherein the first conveyor belt unit is configured to realize continuous transport during the preparation of the honeycomb core sandwich composite board from the thermoplastic resin film;
   the thermoforming device is configured for thermoforming of the thermoplastic resin film; wherein the thermoforming device comprises an upper forming mold and a lower forming mold; two layers of the thermoplastic resin film are respectively placed in the upper forming mold and the lower forming mold, and subjected to thermal molding or vacuum plastic-absorbing thermoforming to form two sheet structures that are continuous along a longitudinal direction and consist of a plurality of semi-hexagonal structures consecutively connected along a transverse direction; each of the two sheet structures comprises a plurality of semi-hexagonal units arranged spaced apart, an engagement portion between adjacent semi-hexagonal units, a first sub connecting portion and a second sub connecting portion respectively arranged on two side edges; the two sheet structures respectively enter engaging parts of the upper forming mold and the lower forming mold; the engagement portions of the two sheet structures are pressed via a roller pressure formed by setting a gap between the engaging parts of the upper and lower forming molds to form the core board that is continuous along longitudinal direction and is formed by a plurality of hexagonal columns consecutively connected along a transverse direction, and two transverse edges of the core board are respectively provided with a first connecting portion and a second connecting portion;
   the first cooling device is configured to cool the core board;
   the first cutting device is configured to cut the core board cooled by the first cooling device up and down at interval to form notches, and the notches are spaced apart up and down and are partially connected;
   the dividing double-roller device is configured to fold the core board with notches to form continuous cells connected side by side in back and forth and provides a pushing pressure required for the connection of side walls;
   the hot melting device is configured to heat the cells connected side by side to achieve hot melting connection of adjacent side walls of between cells to obtain the honeycomb core; and the first unreeling mechanism is configured to unreel a reeled first panel; and the second unreeling mechanism is configured to unreel a reeled second panel.

In some embodiments, the device further comprises:
   the second cutting device is configured to transversely cut the honeycomb core into a plurality of honeycomb core segments according to a preset length;

the delivery mechanism is configured to orderly convey the honeycomb core segments to a preset position;

the pushing mechanism is configured to push the connection structure to realize connection between at least two adjacent honeycomb core segments to form the continuous honeycomb core material; and the hot press laminating device is configured to realize hot press lamination between an upper surface of the continuous honeycomb-core material and the first panel and hot press lamination between a lower surface of the continuous honeycomb-core material and the second panel to form the honeycomb-core sandwich composite panel, and the hot press laminating device comprises a heating device, a hot press laminating roll, a second cooling device and a second conveyor belt device.

In some embodiments, the device further comprises a packaging device configured to perform stacked packaging on the honeycomb core segments with a certain width.

In some embodiments, the device further comprises a longitudinal cutting device configured to longitudinally trim the two longitudinal sides of the honeycomb core sandwich composite panel.

In some embodiments, the device further comprises a third cutting device configured to transversely cut the honeycomb core sandwich composite panel according to a preset length.

By using the above technical solutions, the beneficial effects of the present disclosure are described below.

The bending strength of the honeycomb core sandwich composite panel is improved by optimizing and improving the structure of the honeycomb core material without changing the material and the structure of the panel and the conditions of the composite processing technology. The preparation method is simple, can obtain better mechanical properties by using less material, reduce the production cost, and prepare the honeycomb-core sandwich composite panel with wide width and arbitrary length from multiple segments of continuous honeycomb-core materials with a certain or the same width.

BRIEF DESCRIPTION OF THE DRAWINGS

FIG. 30 is a flow diagram of a method of preparing a honeycomb core sandwich composite panel via a two-layer thermoplastic resin film according to an embodiment of the disclosure;

Figure 1:
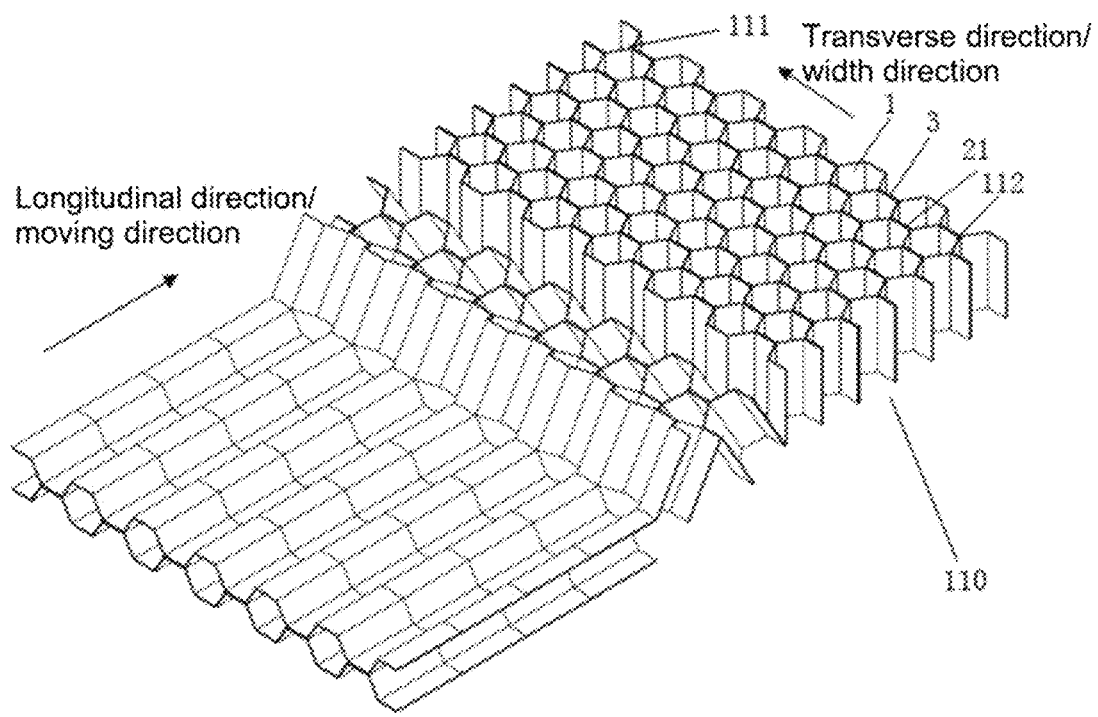
FIG. 1 is a structural diagram of a continuous honeycomb core material according to an embodiment of the disclosure.

In the drawings: 1, cell; 110, continuous honeycomb core material; 111, 111a, 111b, 111c, 111d, 111e, 111f, 111g, 111h, and 111i, first connecting part; 112, 112a, 112b, 112c, 112d, 112e, 112f, 112g, 112h, and 112i, second connecting part; 113, 113a, 113b, 113c, 113d, 113e, 113f, 113g, 113h, and 113i, connecting structure; 114, barb structure; 2, sidewall; 21, adjacent sidewall; 211, support layer; 212, adhesive layer; 3, connecting wall; 40, semi-hexagonal element portion 41, connecting portion; 42, first half of the connecting part; 43, second half of the connecting part; 61, first conveyer belt device; 62, thermoforming device; 63, cutting device; 64, dividing double-roller device; 65, hot milting device; 66, extrusion device; 67, pressing device; 68, first cooling device; 69, continuous honeycomb-core material with the connecting structure; 69 a, upper and lower surface of the continuous honeycomb core material with the connecting structure; 70, decorative layer; 71, bulk layer; 72, interface layer; 73, panel; 79, heating device; 80, hot-pressing composite roll; 81, second cooling device; 82, second conveyer belt device; 91, hot-pressing composite device; 92, first unreeling mechanism; 93, second unreeling mechanism; 94, delivery mechanism; 95, pushing mechanism; 96, traction mechanism; 97, longitudinal cutting device; 98, second cutting device; and 99, landing device.

DETAILED DESCRIPTION OF EMBODIMENTS

The present disclosure will be illustrated in detail below with reference to the embodiments. The following embodiments are only better embodiments of the disclosure, and are not intended to limit the implementation of the disclosure.

Embodiment 1

As shown in FIG. 1, an embodiment of the disclosure provides a continuous honeycomb core material 110, including a plurality of honeycomb cores. Each of the plurality of honeycomb cores includes a plurality of cells 1 arranged in rows. Each of the plurality of cells 1 is a hexagonal column formed by side walls 2, where adjacent cells along a transverse direction are connected by a connecting wall arranged transversely, adjacent side walls 21 of adjacent cells 1 along a longitudinal direction are attached to each other through adhesive layers. In this embodiment, each of the plurality of cells 1 is a hexagonal column, but it should be understood that the cross-sectional shape of the cell in the honeycomb-core material can be selected as needed, for example, it can be polygon, preferably even polygon.

Figure 2:
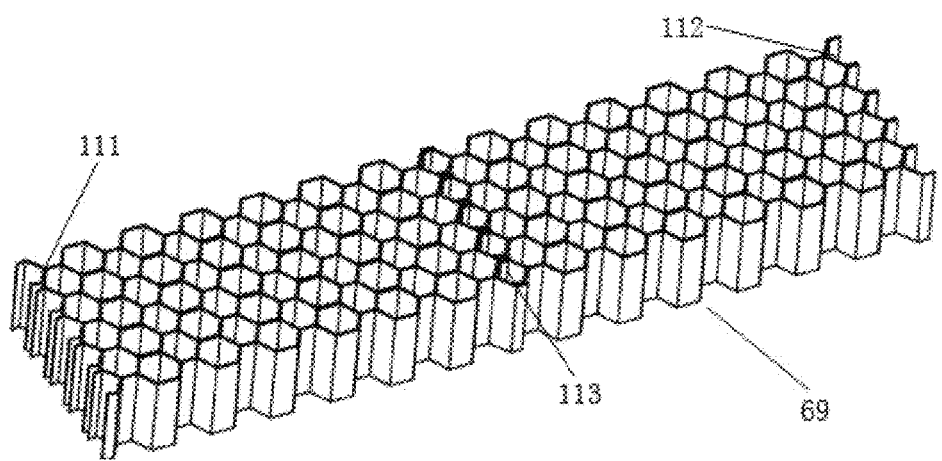
FIG. 2 is a structural diagram of a continuous honeycomb core material containing a connecting structure according to an embodiment of the disclosure.

As shown in FIG. 2, a connecting structure 113 is arranged between adjacent two honeycomb cores. The connecting structure 113 includes a first connecting portion 111 and a second connecting portion 112 corresponding to the first connecting portion, and the first connecting portion 111 and the second connecting portion 112 are respectively arranged on edges of two transverse sides of each of the plurality of honeycomb cores to form a continuous honeycomb core material 110. The first connecting portion 111 of one of adjacent two honeycomb cores and the second portion 112 of the other of the adjacent two honeycomb cores are staggeredly engaged to form a connecting structure 113. At least two continuous honeycomb core materials are connected via the connecting structure 113 to form a continuous honeycomb core material with the connecting structure 69.

Figure 3:
FIG. 3 depicts the structure of the side walls of the cell with two layers of sidewalls according to an embodiment of the disclosure.
Figure 4:
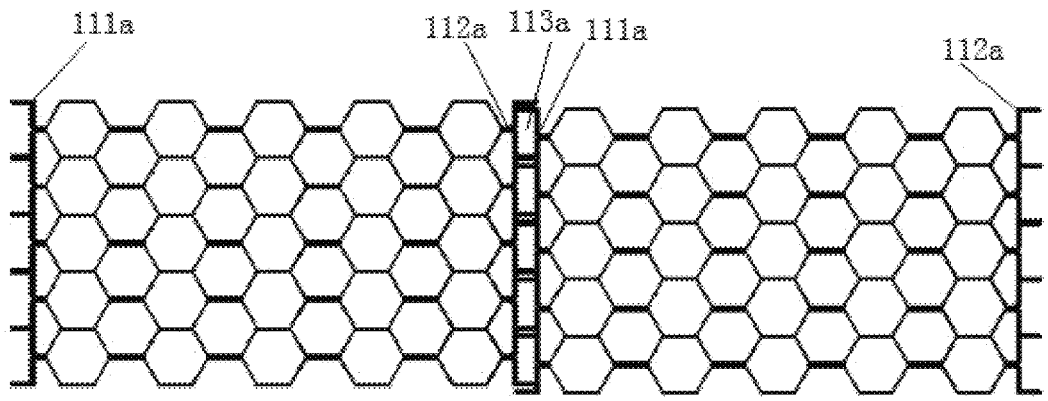
FIG. 4 is a structural plan view of a continuous honeycomb core material with a connecting structure with a quadrilateral cross section formed via a staggered connection according to an embodiment of the disclosure.

As shown in FIG. 3, the side wall 2 of the cell 1 have a two-layer structure, including a support layer 211 and an adhesive layer 212, where the inner layer is the support layer 211, the outer layer is the adhesive layer 212. It should be understood by those skilled in the art that, the layer number and the distribution of the side walls 2 are limited in the present invention, as long as the adjacent side walls 21 of adjacent cells 1 along a longitudinal direction can be connected by the hot melting via the adhesive layer 212, for example, the side wall 2 of the cell 1 of the present invention can also be a three-layer structure, where two sides of the support layer 211 are respectively provided with one adhesive layer 212.

In this embodiment, the support layer 211 and the adhesive layer 212 in the sidewall of the cell 1 are made of different materials, where the support layer 211 is made of polypropylene material and the adhesive layer 212 is made of ethylene acetate copolymer (EVA) material with an ethylene acetate (VA) content of 28. A softening point of the support layer 211 is 130° C., and a melting point of the adhesive layer 212 is 60° C. The heating temperature can be controlled at 80~100° C. to melt the adhesive layer 212 to achieve a hot-melting connection, at this time, the heat received by the support layer 211 is lower than the softening point such that the support layer 211 still has the mechanical properties at room temperature and can provide the required support force during the folding fit between the adjacent cells 1, which can effectively maintain the geometry of the cells and obtain a higher bonding strength between the adjacent side walls 21, greatly improving the compression strength of the honeycomb core material. The adhesive layer is made of the material with a melting point temperature of 40-80° C., and the support layer is made of the material with a softening point temperature of 150-160° C.

In this embodiment, the adhesive layer 212 is made of ethylene copolymers such as EVA (Ethylene-vinyl acetate copolymer), EAA (ethylene acrylate copolymer), and EMA (ethylene-Malay-acrylic copolymer). The support layer 211 is made of the polymer materials that can prepared by a flow-casting method, such as PP (polypropylene), PA (polyamide), PC (polycarbonate), PET (polyphthalate glycol), and so on. The support layer may also be made of the modified resin materials, including fiber-reinforced thermoplastic materials, which are suitable for the present invention but not limited to those described herein, such as LFT (long fiber thermoplastics) and LFT-D. The suitable reinforced fibers include, but are not limited to those stated herein, such as glass fiber, carbon fiber, etc. The adapted fiber reinforced thermoplastic resins, but not limited to those stated herein, such as polypropylene resin PP, PET resin, nylon resin PA6 or PA66, PC resin, PEEK resin, PPS resin, etc. The compressive strength of the honeycomb-core material without changing the thermoplastic resin of the main body and without affecting the hot-melting connection characteristics of the connecting interface between the panel and the upper and lower surfaces of honeycomb-core material can be improved by utilizing the mechanical properties of the fiber reinforced thermoplastic resin.

Figure 25:
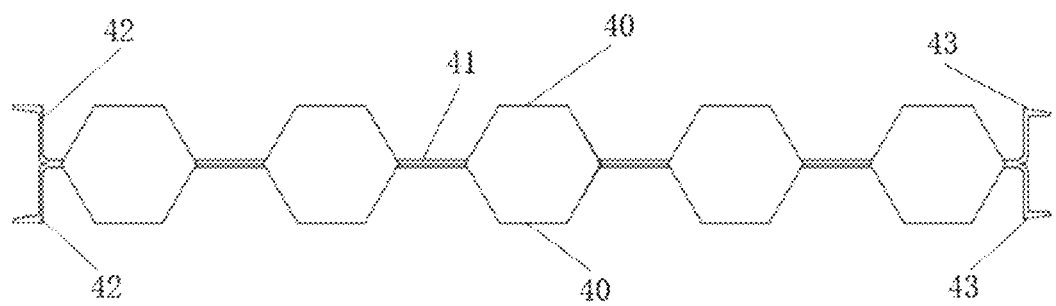
FIG. 25 schematically depicts the formation of a core panel during the preparation of the honeycomb sandwich composite panel according to an embodiment of the disclosure.

As shown in FIG. 25, a sheet structure is continuous along a longitudinal direction and is formed by a plurality of semi-hexagonal structures consecutively connected along a transverse direction. Two sheet structures are bonded to form a core board, and the core board is continuous along a longitudinal direction and is formed by a plurality of hexagonal columns consecutively connected along a transverse direction. Two transverse edges of the core board are respectively provided with a first connecting portion 111 and a second connecting portion 112. The sheet structure includes a plurality of semi-hexagonal units 40 arranged spaced apart, an engagement portion 41 between adjacent semi-hexagonal units, and a first sub connecting portion 42 and a second sub connecting portion 43 respectively arranged on two side edges.

Figure 26:
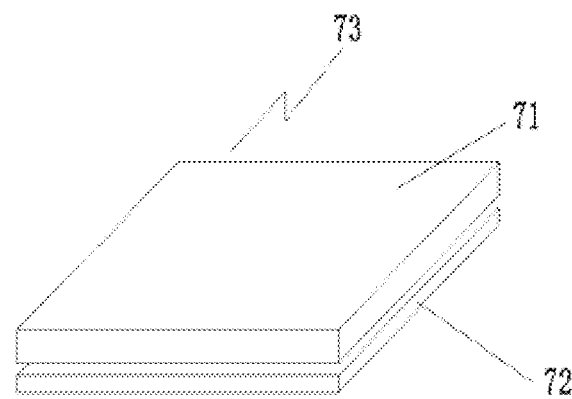
FIG. 26 is a structural diagram of a panel according to an embodiment of the disclosure.

As shown in FIG. 26, the panel 73 of honeycomb core sandwich composite panel is made from the bulk layer 71 and the interface layer 72 through the upper and lower superposition layering design and the heating composite process. The bulk layer 71 is the outer layer of the panel 73, which is made of continuous fiber-reinforced thermoplastic materials with higher mechanical properties and melting points. The interface layer 72 is the inner layer of the panel 73, which is made of continuous fiber-reinforced thermoplastic materials or thermoplastic resin films with lower melting points. The panel 73 includes at least one continuous fiber-reinforced thermoplastic layer. A melting point of thermoplastic resin in the bulk layer 71 is higher than that in the interface layer 72, and a melting point of the interface layer 72 is the same or compatible with that of the support layer 211. The bulk layer 71 of the panel 73 is made of at least one continuous fiber-reinforced thermoplastic material with different material properties. The bulk layer 71 of the panel 73 is manufactured with the continuous fiber-reinforced thermoplastic sheet with higher performance as the outer layer and the continuous fiber-reinforced thermoplastic sheet with lower performance as the adjacent inner layer, or by the continuous fiber reinforced thermoplastic sheet with higher performance and the continuous fiber reinforced thermoplastic sheet with a lower performance by alternating high and low layer.

Figure 27:
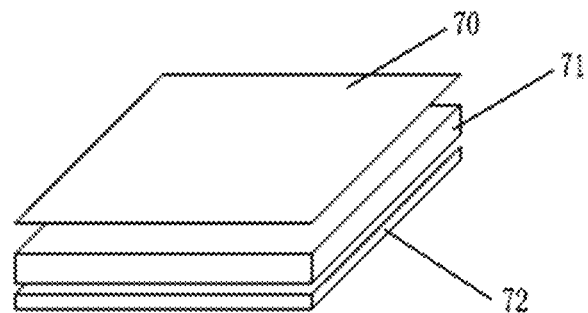
FIG. 27 is a structural diagram of a panel with a decorative layer according to an embodiment of the disclosure.

As shown in FIG. 27, the panel 73 further includes a decorative layer 70. The decorative layer 70 is arranged on the outer edge of the bulk layer 71, and the inner side of the bulk layer 71 is the interface layer 72. The decorative layer 70 is made of thermoplastic resin film materials and can be one or multiple layers. The honeycomb-core sandwich composite panel can be more beautiful by using the decorative layer 70 with exterior decorative features or fire and hot proof. Thermoplastic resin film materials include, but are not limited to those stated herein, such as polycarbonate, polyvinyl chloride, polymethyl methacrylate, polyethylene terephthalate, polyphenylene ether, polyphenylene sulfide, polyether ether ketone, etc.

Figure 28:
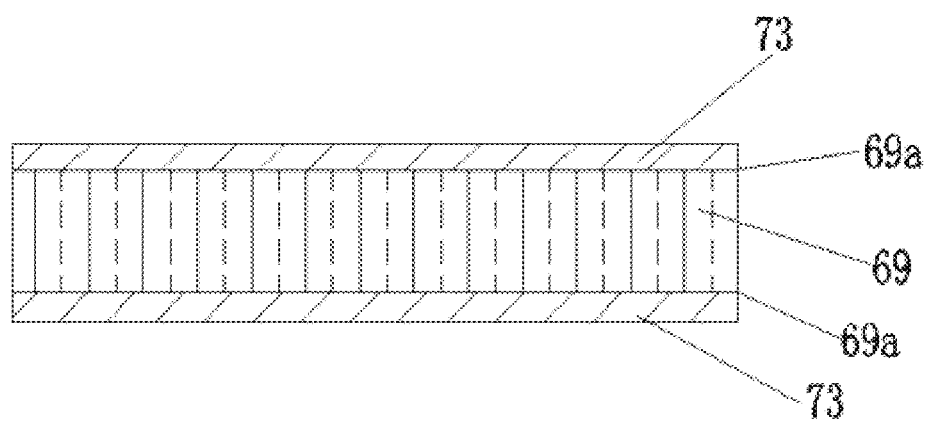
FIG. 28 is a structural diagram of a honeycomb core sandwich composite panel according to an embodiment of the disclosure.
Figure 29:
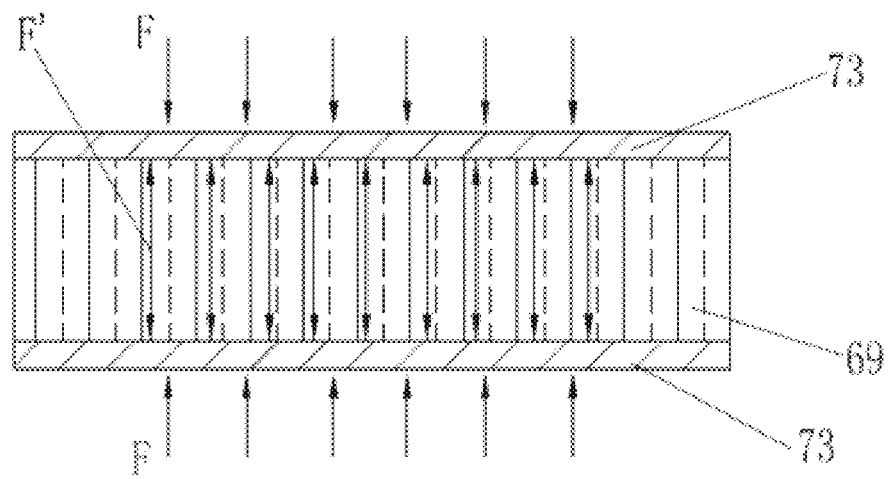
FIG. 29 schematically depicts the force directions of a honeycomb core sandwich composite panel during the heat laminated process according to an embodiment of the disclosure.

As shown in FIG. 28, the honeycomb-core sandwich composite panel includes at least two continuous honeycomb core materials 110, a continuous honeycomb-core material with the connecting structure 69 connected by a connecting structure 113, and the panels 73. The panels 73 includes a first panel and a second panel, the first panel is arranged on the upper surface 69a of the continuous honeycomb-core material, and the second panel is arranged on the lower surface 69a of the continuous honeycomb-core material. The upper and lower surfaces of the continuous honeycomb-core material with the connecting structure are respectively attached to the first and second panels 73 to form, the honeycomb-core sandwich composite panel by heat-press compounding. As shown in FIG. 29, the force and reacting force F required for the hot pressing on the first and second panels 73 of the honeycomb-core sandwich composite panel and the upper and lower surfaces 69a of the continuous honeycomb-core material are determined according to the FIG. 32, or the key process design parameters of the honeycomb core sandwich composite panel with high performance manufactured by a similar thermal compounding device.

Embodiment 1-1

Figure 5:
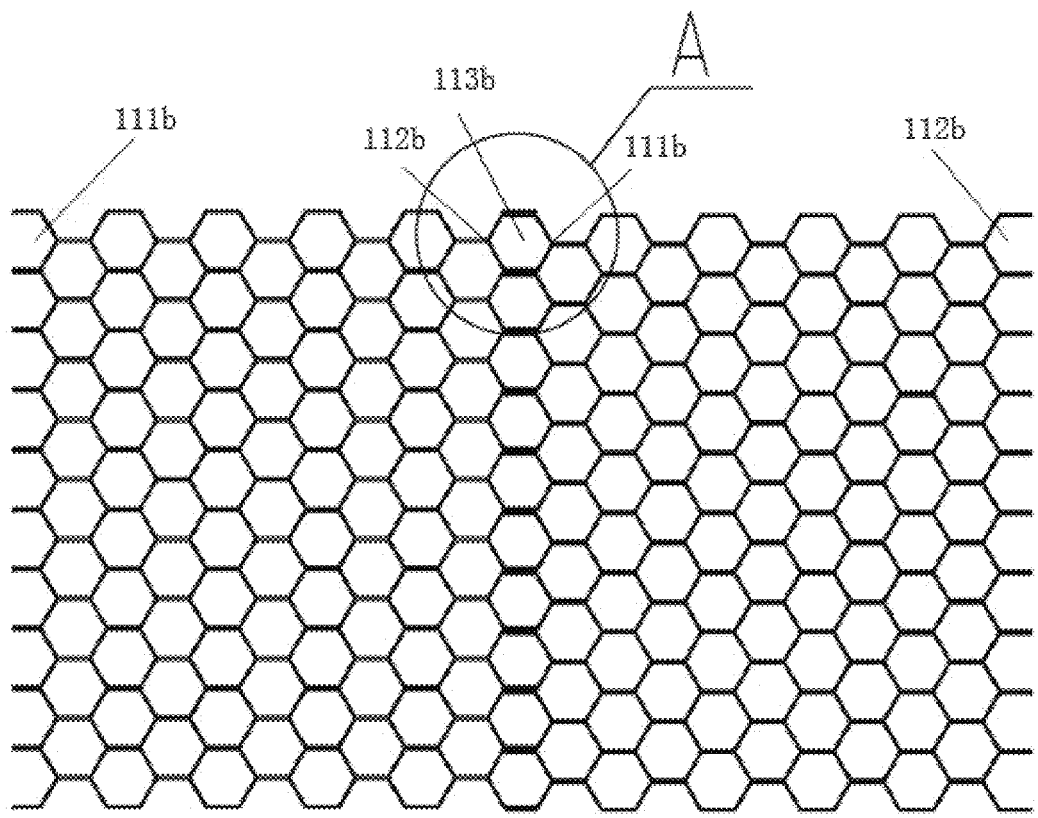
FIG. 5 is a structural plan view of a continuous honeycomb core material with a connecting structure with a hexagonal cross section formed via a staggered connection according to an embodiment of the disclosure.

As shown in FIG. 5, the first connecting portion 111a of one of adjacent two honeycomb cores and the second connecting part 112a of the other of the adjacent two honeycomb cores are staggered to a connecting structure 113a with a quadrilateral cross section.

Embodiment 1-2

Figure 6:
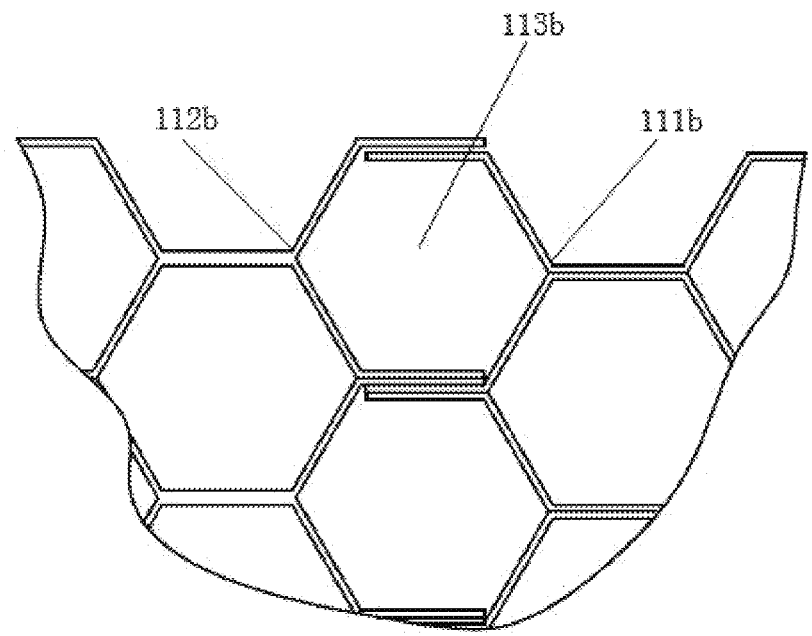
FIG. 6 is an enlargement view of position A of the connecting structure in FIG. 5.
Figure 7:
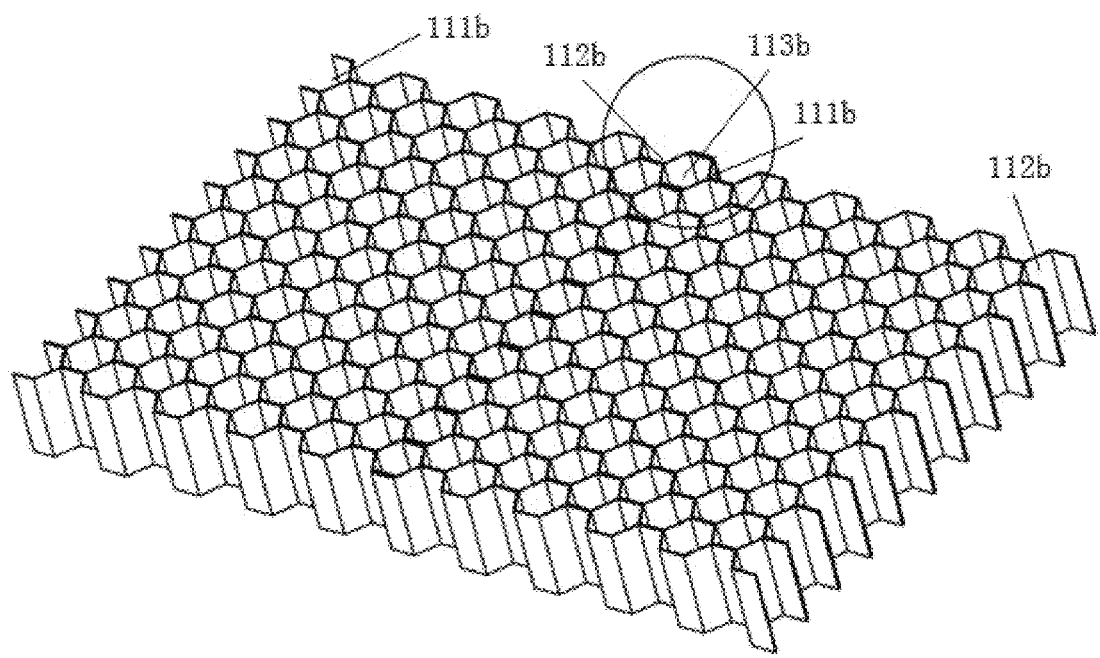
FIG. 7 is a structural perspective view of a continuous honeycomb core material with a connecting structure with a hexagonal cross section formed via a staggered connection according to an embodiment of the disclosure.

As shown in FIGS. 5-7, the first connecting part 111b of one of adjacent two honeycomb cores and the second connecting part 112b of the other of the adjacent two honeycomb cores are staggered to form a connecting structure 113b with a hexagonal cross-section.

Embodiment 1-3

Figure 8:
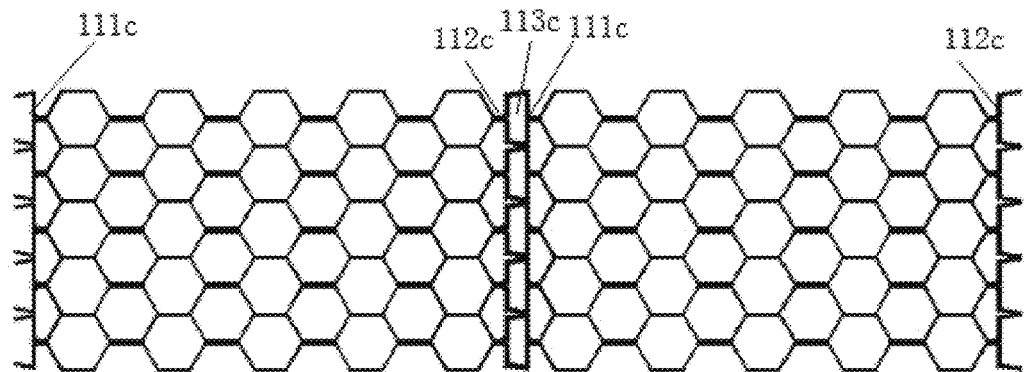
FIG. 8 is a structural plan view of a continuous honeycomb core material with a connecting structure with a trapezoidal cross section formed via an adhering connection according to an embodiment of the disclosure.

As shown in FIG. 8, the first connecting portion 111c of one of adjacent two honeycomb cores and the second connecting portion 112c of the other of the adjacent two honeycomb cores fit each other to form a connecting structure 113c with a trapezoidal cross section. The first connecting portion 111c has an inward-splayed cross section, and the second connecting portion 112c has an outward-splayed cross section.

Embodiment 1-4

Figure 9:
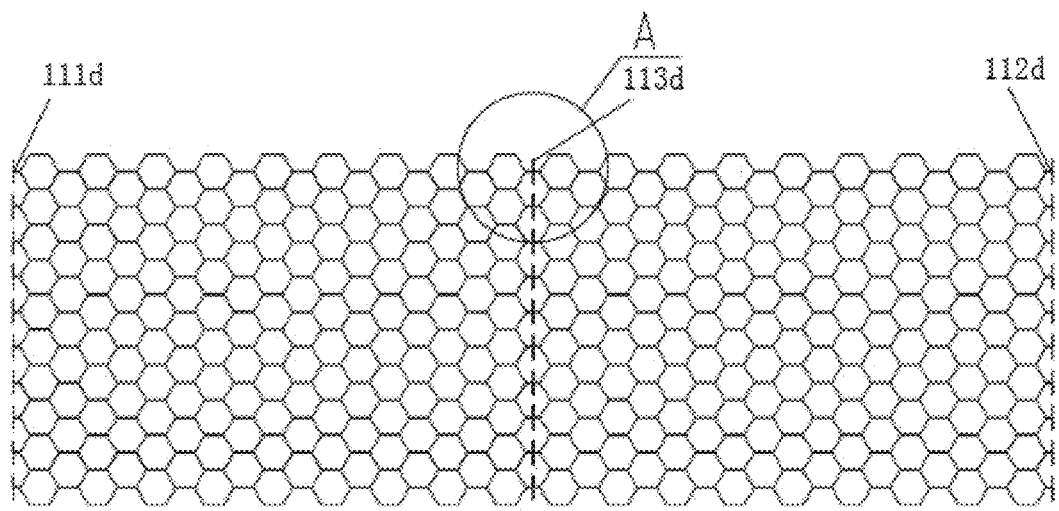
FIG. 9 is a structural plan view of a continuous honeycomb-core material with a connecting structure with a cross-type cross section formed via an adhering connection according to an embodiment of the disclosure.
Figure 10:
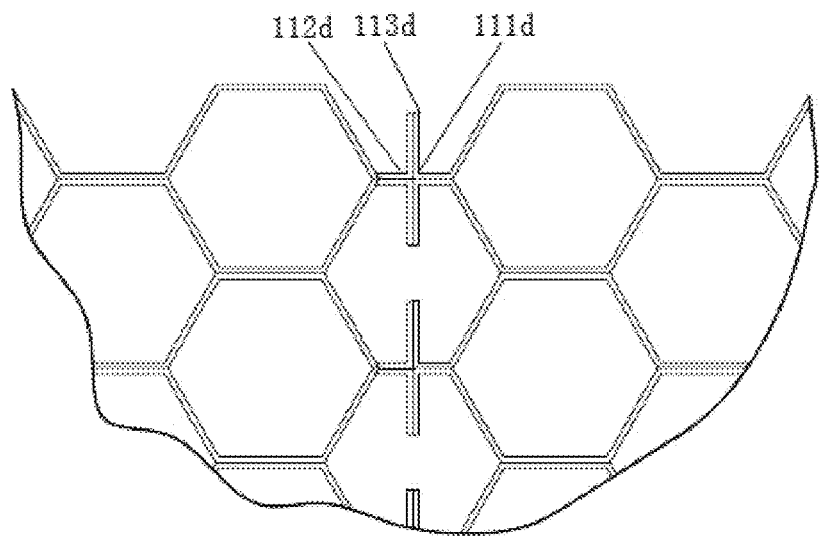
FIG. 10 is an enlarged view of position A of the connecting structure in FIG. 9.
Figure 11:
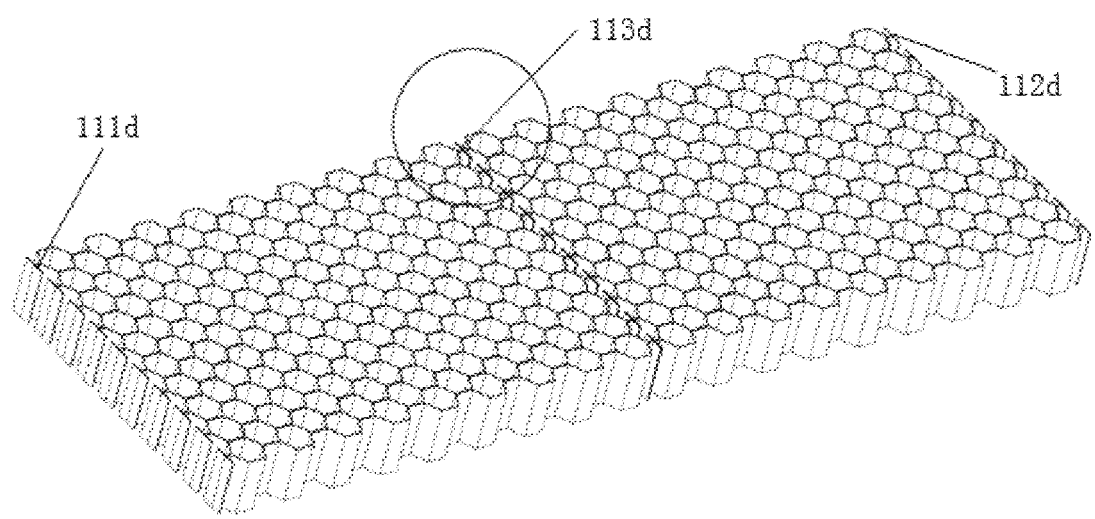
FIG. 11 is a structural perspective view of a continuous honeycomb-core material with a connecting structure with a cross-type cross section formed via an adhering connection according to an embodiment of the disclosure.

As shown in FIGS. 9-11, the first connecting portion 11d of one of adjacent two honeycomb cores and the second connecting portion 112d of the other of the adjacent two honeycomb core fit each other to form a connecting structure 113d with a cross-shaped cross section. The first connecting portion 111d and the second connecting portion 112d both have a T-shaped cross section.

Embodiment 1-5

Figure 12:
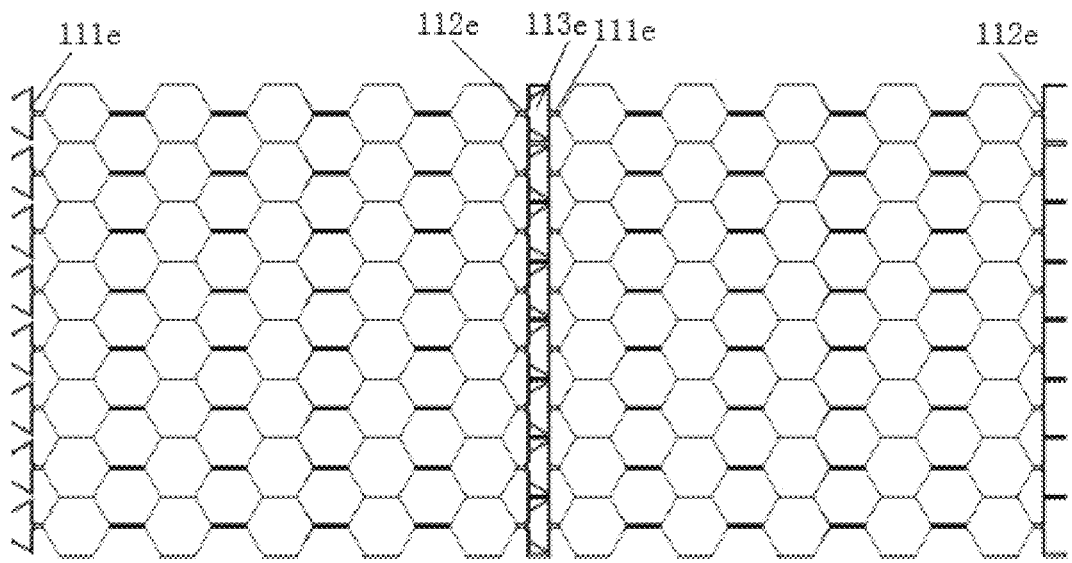
FIG. 12 is a structural plan view of a continuous honeycomb core material with a connecting structure with a quadrilateral cross section formed via an inserted connection according to an embodiment of the disclosure.

As shown in FIG. 12, the first connecting portion 111e of one of adjacent two honeycomb cores is inserted into the second connecting portion 112e of the other of the adjacent two honeycomb cores to form a connecting structure 113e with a quadrilateral cross section. The first connecting portion 112e is engaged in a groove formed by the second connecting portion 113e to enable connection between the adjacent two honeycomb cores, and the first connecting portion 111e has an inward-splayed cross section.

Embodiment 1-6

Figure 13:
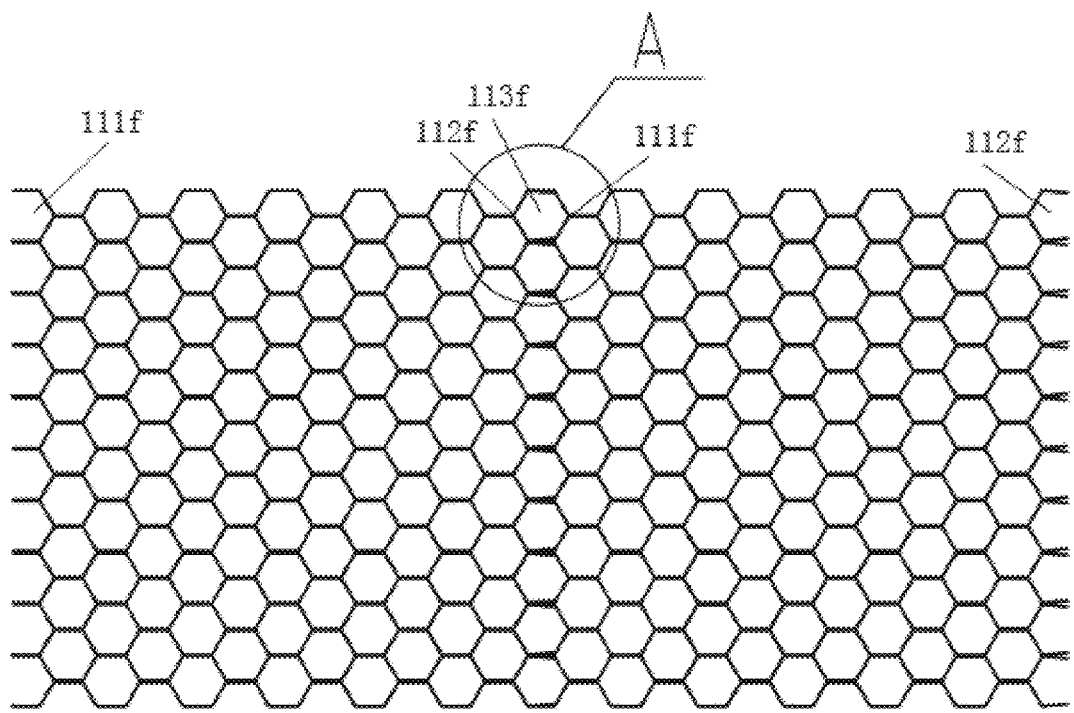
FIG. 13 is a structural plan view of a continuous honeycomb core material with a connecting structure with a hexagonal cross section formed via an inserted connection according to an embodiment of the disclosure.
Figure 14:
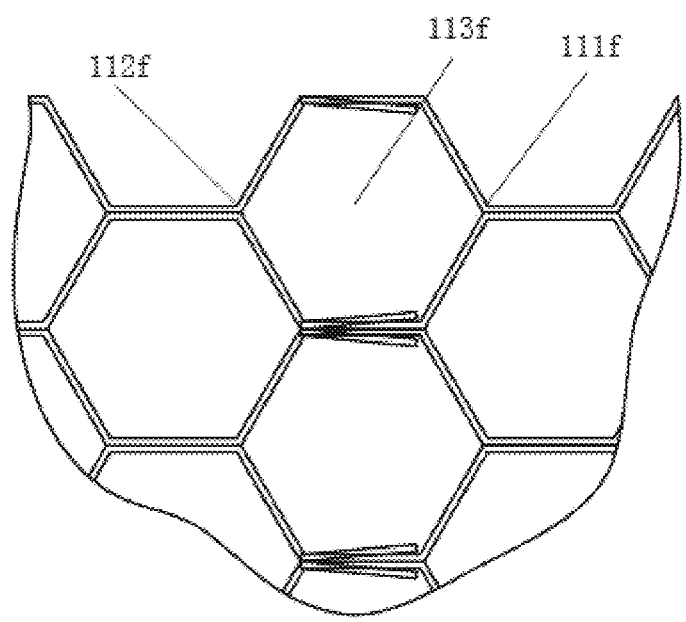
FIG. 14 is an enlargement view of position A of the connecting structure in FIG. 13.
Figure 15:
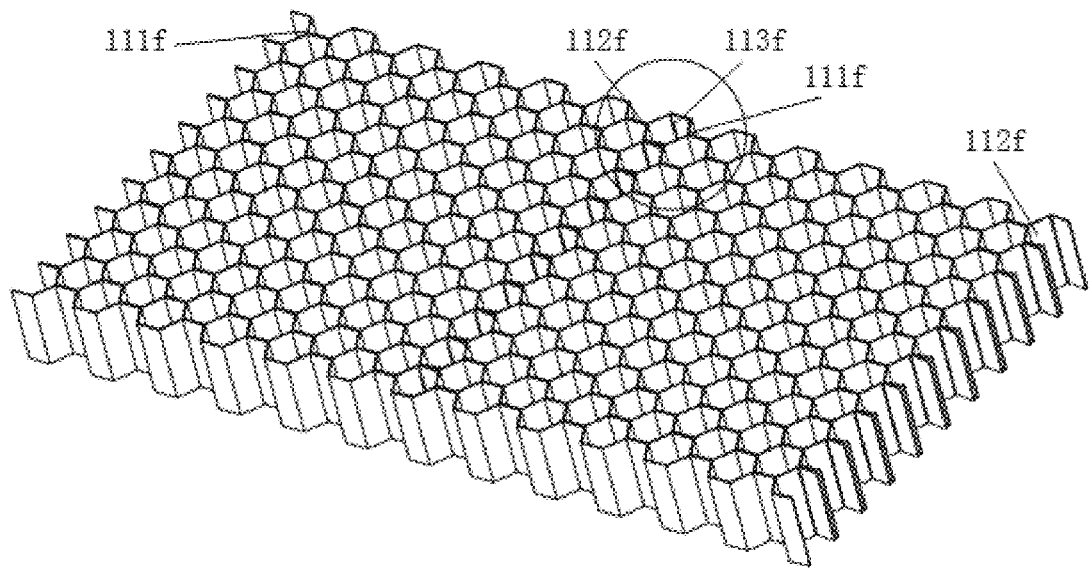
FIG. 15 is a structural perspective view of a continuous honeycomb-core material with a connecting structure with a hexagonal cross section formed via an inserted connection according to an embodiment of the disclosure.

As shown in FIGS. 13-15, the first connecting portion 111f of one of the adjacent two honeycomb cores is inserted into the second connecting portion 112f of the other of the adjacent two honeycomb cores to form a connecting structure 113*f* with a hexagonal cross-section. The first connecting portion 111*f* is engaged in a groove formed by the second connecting portion 112*f*, forming a connection between the adjacent two honeycomb cores.

Embodiment 1-7

Figure 16:
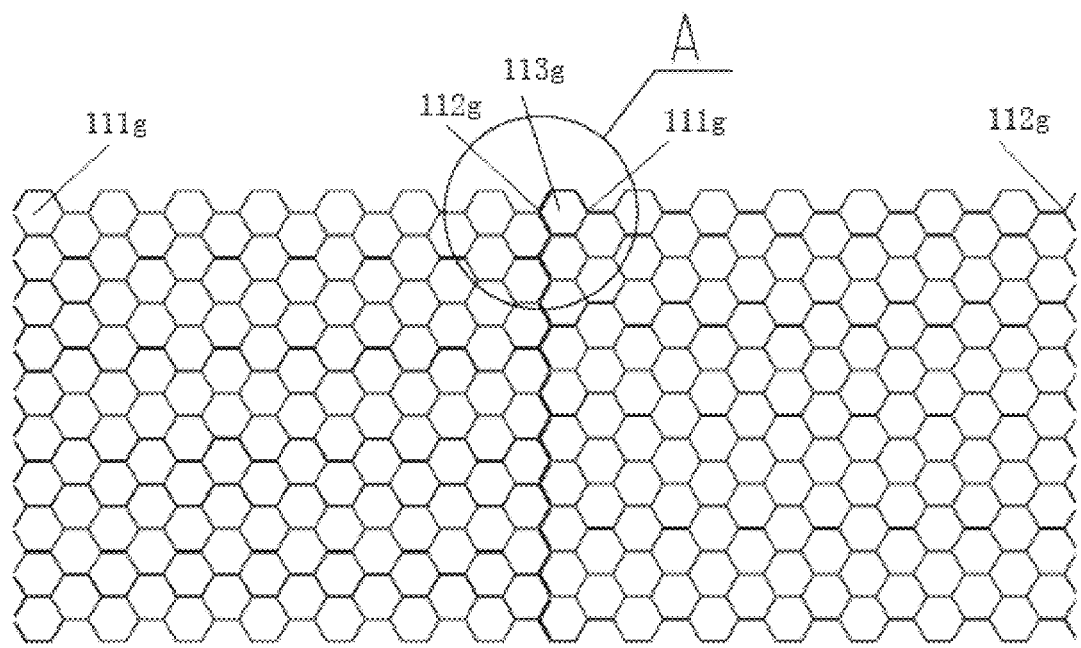
FIG. 16 is a structural plan view of a continuous honeycomb core material with a connecting structure with a hexagonal cross section formed via an inserted connection according to an embodiment of the disclosure.
Figure 17:
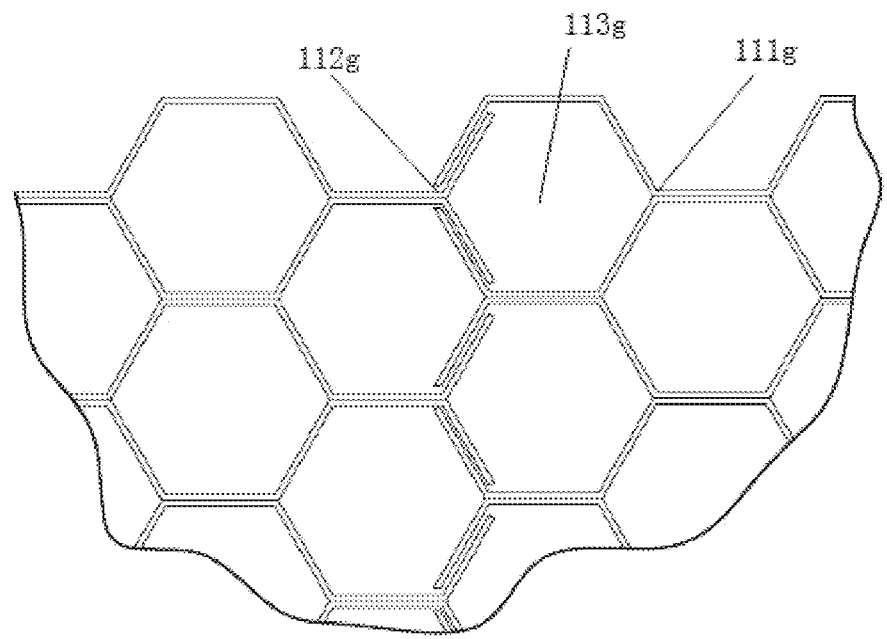
FIG. 17 is an enlargement view of position A of the connecting structure in FIG. 16.
Figure 18:
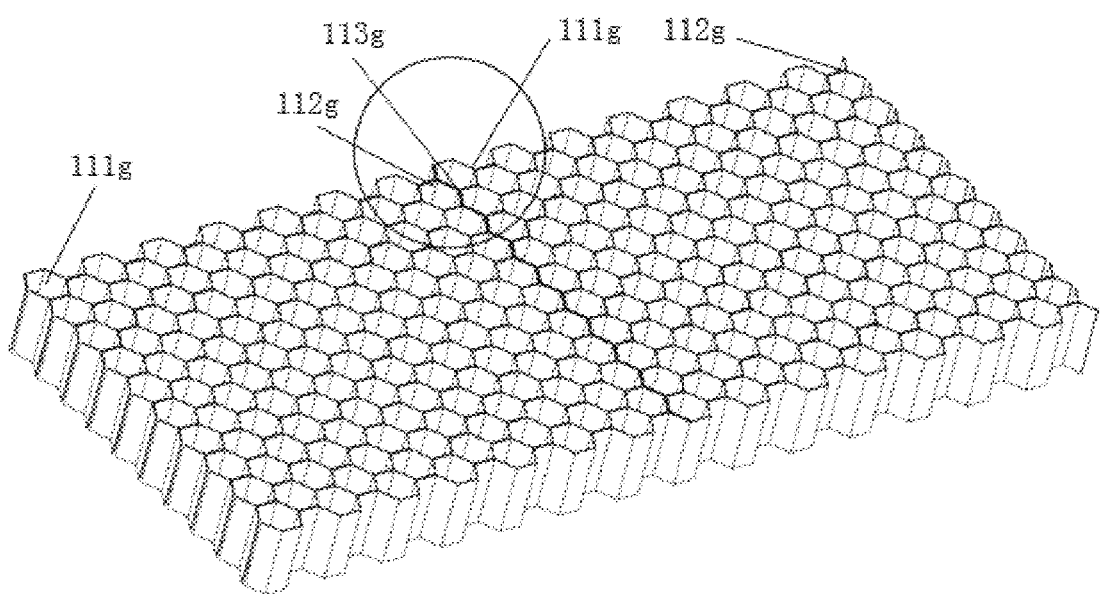
FIG. 18 is a structural perspective view of a continuous honeycomb core material with a connecting structure with a hexagonal cross section formed via an inserted connection according to an embodiment of the disclosure.

As shown in FIGS. 16-18, the first connecting portion 111*g* of one of the adjacent two honeycomb cores is inserted into the second connecting portion 112*g* of the other of the adjacent two honeycomb cores to form a connecting structure 113*g* with a hexagonal cross section. The first connecting portion 111*g* has a hexagonal cross section with an opening, and a cross section of the second connecting portion 112*g* is Y-shaped. The first connecting portion 111*g* is engaged in a groove formed by the second connecting portion 112*g*, forming a connection between adjacent two honeycomb cores. The first connecting portion 111*g* of one of the adjacent two honeycomb cores and the second connecting portion 112*g* of the other of the adjacent two honeycomb cores are engaged via an insertion engagement.

Embodiment 1-8

Figure 19:
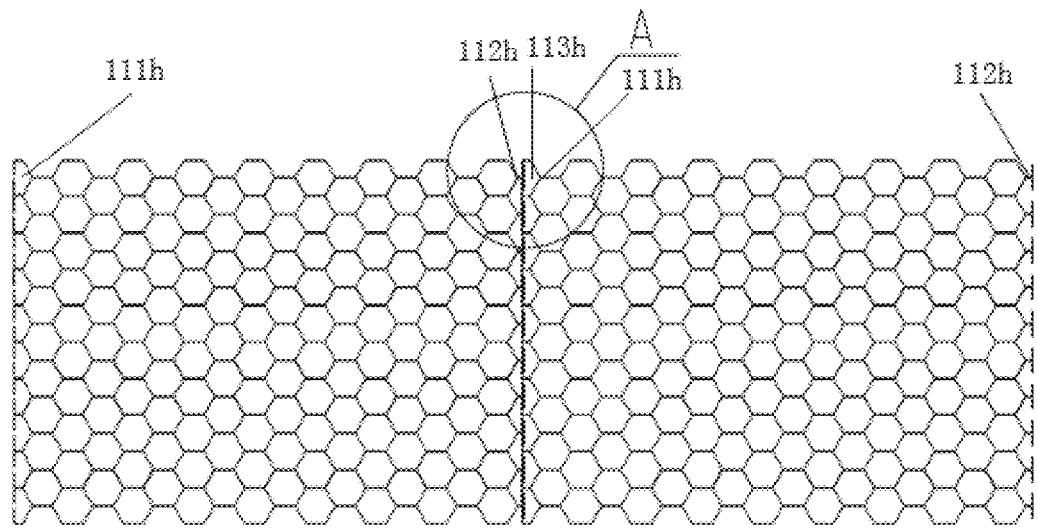
FIG. 19 is a structural plan view of a continuous honeycomb-core material with a connecting structure with a pentagonal cross section formed via an inserted connection according to an embodiment of the disclosure.
Figure 20:
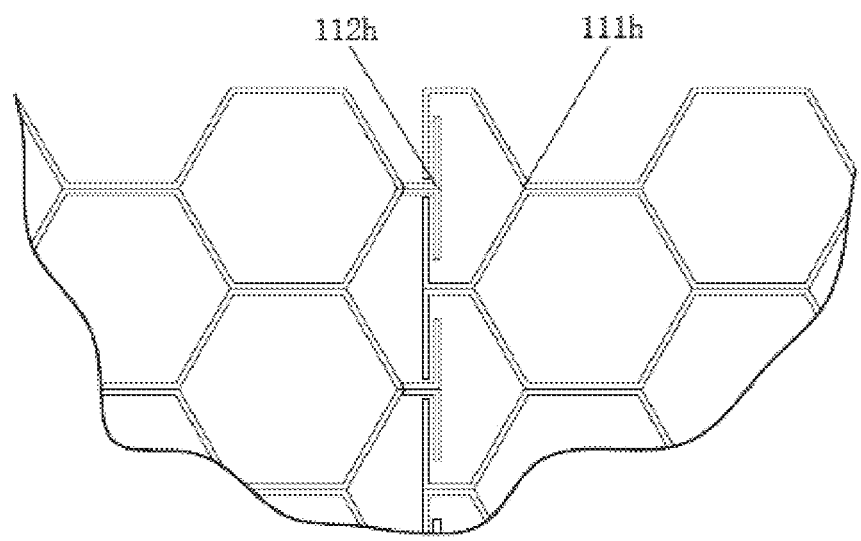
FIG. 20 is an enlarged view of position A of the connecting structure in FIG. 19.
Figure 21:
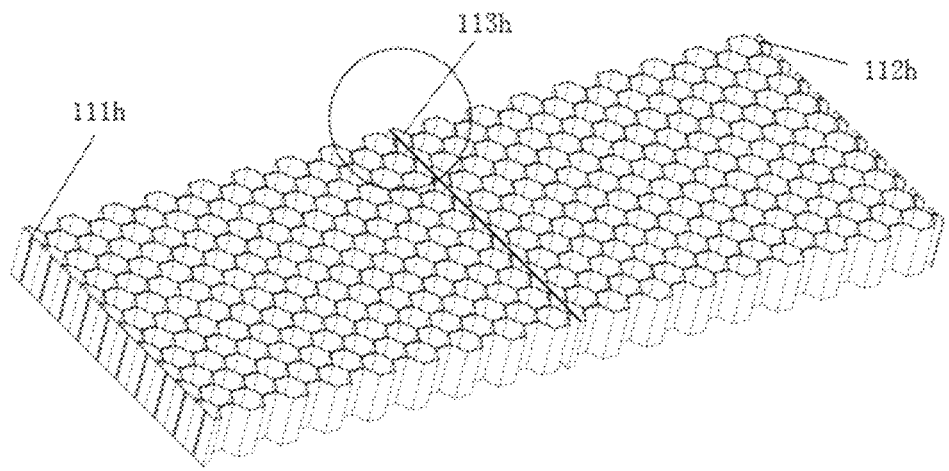
FIG. 21 is a structural perspective view of a continuous honeycomb core material with a connecting structure with a pentagonal cross section formed via an inserted connection according to an embodiment of the disclosure.

As shown in FIGS. 19-21, the first connecting portion 111*h* of one of the adjacent two honeycomb cores is inserted into the second connecting portion 112*h* of the other of the adjacent two honeycomb cores to form a connecting structure 113*h* with a pentagonal cross section. The first connecting portion 111*h* has a pentagonal cross section with an opening, and a cross section of the second connecting portion 112*h* is T-shaped. The first connecting portion 111*h* is engaged in a groove formed by the second connecting portion 112*h*, forming a connection between adjacent two honeycomb cores. The first connecting portion 111*h* of one of the adjacent two honeycomb cores and the second connecting portion 112*h* of the other of the adjacent two honeycomb cores are engaged via an insertion engagement.

Embodiment 1-9

Figure 22:
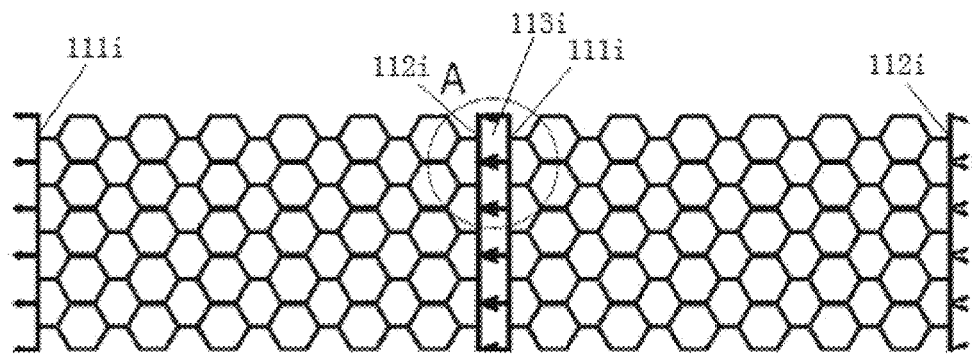
FIG. 22 is a structural plan view of a continuous honeycomb core material with a connecting structure with a barbed structure formed via a barbed connection according to an embodiment of the disclosure.
Figure 23:
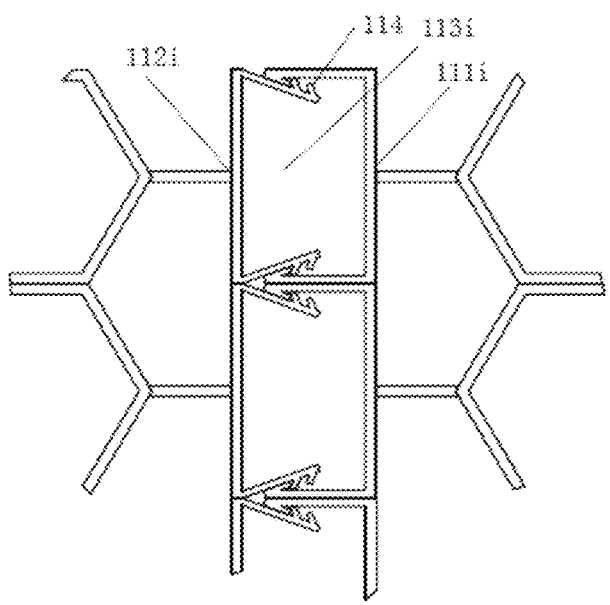
FIG. 23 is an enlargement view of position A of the connecting structure in FIG. 22.
Figure 24:
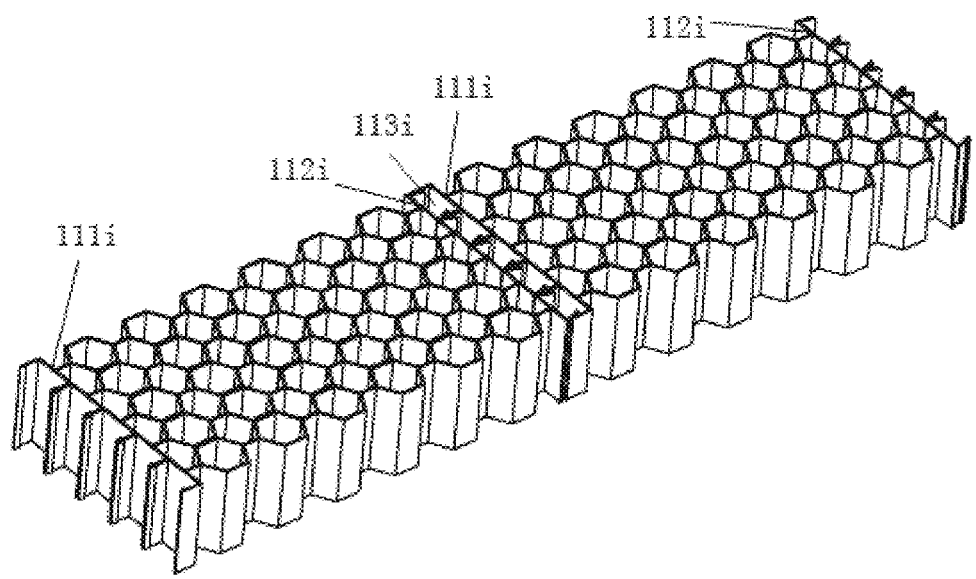
FIG. 24 is a structural perspective view of a continuous honeycomb core material with a connecting structure with a barbed structure formed via a barbed connection according to an embodiment of the disclosure.

As shown in FIGS. 22-24, the first connecting portion 111*i* and the second connecting portion 112*i* are respectively provided with at least one barb structure 114. The at least one barb structure on the first connecting portion 111*i* of one of the adjacent two honeycomb cores and at least one barb structure 114 of the second connecting portion 112*i* of the other of the adjacent two honeycomb cores are engaged to form a connecting structure 113*i* with a quadrilateral cross-section.

As illustrated in Embodiments 1-1 to 1-9, a structure or a shape of the first connecting portion 111 and the second connecting portion 112 can be the same, or different. The cross-sectional shapes of the first and second connecting parts portion, but are not limited to those stated herein, tetragon, pentagon, hexagon and other polygons. The connecting modes of the first connecting portion and the second connecting portion include, but are not limited to those stated herein, the staggered connection, the fitting connection, the insertion connection, and the barb connection, etc.

Embodiment 2

As shown in FIG. 30, a honeycomb core sandwich composite panel is prepared by using a first thermoplastic resin film with a two-layer structure. The thermoplastic resin film includes a support layer 211 and an adhesive layer 212, which are made of different materials. A melting point of the adhesive layer 212 is lower than a softening point of the support layer 211. The steps of the preparation method are described below.

(S1) A first thermoplastic resin film is processed via a thermal molding process or a vacuum plastic-absorbing thermoforming process to obtain a sheet structure. The sheet structure is continuous along a longitudinal direction and is formed by a plurality of semi-hexagonal structures consecutively connected along a transverse direction. The sheet structure includes a plurality of semi-hexagonal units 40 arranged spaced apart, an engagement portion 41 between adjacent semi-hexagonal units, a first sub connecting portion 42 and a second sub connecting portion 43 respectively arranged on two side edges.

(S2) The engagement portions 41 of the two sheet structures are aligned and bonded via a thermal pressing process or an ultrasonic thermal welding process to form a core board. The core board is continuous along a longitudinal direction and is formed by a plurality of hexagonal columns consecutively connected along a transverse direction. Two transverse edges of the core board are respectively provided with a first connecting portion 111 and a second connecting portion 112. The outer side of the core board is an adhesive layer 212, and the inner layer of the core board is a support layer 212.

(S3) The core board is cut up and down at intervals to form notches, and the notches are spaced apart up and down and are partially connected. During the cutting, the core board is not completely cut off, and a connecting edge is retained at the notches. The cutting methods can be selected from the existing methods based on the actual needs to meet production requirements for the continuous honeycomb-core materials with different thicknesses, such as the metal or non-metallic blade cutting, the laser cutting, the high-pressure hydraulic cutting, the wire cutting, the resistance wire cutting or the plasma cutting, etc.

(S4) The core board with notches is rotated by positive or negative 90 degrees in a direction of the notches to fold the core board with the notches as a folding position and the connecting edge at the notches as a folding rotation axis. After folding, the connecting portions 42 fit to each other in the core board form a connecting wall 3 connected to the adjacent transverse cell 1. The first sub connecting portion 42 and the second sub connecting portion 43 on the two transverse sides of the core board fit to each other to form a first connecting portion 111 and a second connecting portion 112. The adjacent side walls 21 of adjacent cells along a longitudinal direction are bonded to each other, and a hot-melt adhesive layer 212 is formed on the adjacent side walls 21 of adjacent cells along a longitudinal direction by heating. The adjacent sidewalls 21 are bonded to form the continuous honeycomb core material 110. The heating temperature is between the melting point of the adhesive layer 212 and the softening point of the support layer 211, so as to obtain a higher bonding strength of the adjacent side walls and improve the compressive strength of the continuous honeycomb-core material without changing the geometric shape of cells.

(S5) The continuous honeycomb core material 110 is transversely cut according to a preset length to a plurality of continuous honeycomb core materials 110 segments with a certain width.

(S6) At least two segments of the continuous honeycomb core material 110 with a certain width are connected via a connecting structure 113 to form a continuous honeycomb core material with the connecting structure 69. The upper and lower surfaces 69a of the continuous honeycomb core material are respectively attached to the first and second panels 73. The interface layer 72 between the first and second surfaces 69a of the continuous honeycomb core material and the panel 73 are heated respectively to reach a preset melting temperature. The continuous honeycomb core material, the first panel and the second panel are subjected to heat-press compounding followed by cooling molding to obtain the honeycomb core sandwich composite panel. The first connecting portion 111 of one of adjacent two honeycomb cores is inserted into the second connecting portion 112 of the other of the adjacent two honeycomb cores can be connected by the opposite connection, the up-and-down insertion connection, horizontal connection, or vertical connection, but not limited to those stated herein.

In an embodiment, the first thermoplastic resin film includes the support layer 211 and the adhesive layer 212, and the support layer and the adhesive layer are made of different materials. A melting point of the adhesive layer 212 is lower than a softening point of the support layer 211. The outer side of the core board in step (S2) is the adhesive layer 212. In step (S4), adhesive layers 212 of side walls of cells connected side by side after the folding are bound by hot-melting. A heating temperature of the hot-melting is between the melting point of the adhesive layer 212 and the softening point of the support layer 211.

In an embodiment, the first thermoplastic resin film has a single-layer structure. In step (S1), the first thermoplastic resin film with the single-layer structure is configured as the support layer 211, and two layers of a second thermoplastic resin film are respectively bound to two sides of the support layer 211 as the adhesive layer 212 by heat-press compounding. A melting point of the adhesive layer 212 is lower than a softening point of the support layer 211. In step (S4), adhesive layers 212 of side walls of the cells connected side by side after the folding are bound by hot-melting, and a heating temperature of the hot-melting is between the melting point of the adhesive layer 212 and the softening point of the support layer 211.

In an embodiment, the panel 73 has a monomer structure, which is composed of at least one composite layer composed of the same continuous fiber-reinforced thermoplastic material. In this embodiment, the monomer structure is the bulk layer 71.

The step (6) further includes the following steps.

(S61) At least one layer of the continuous fiber-reinforced thermoplastic material at an outer side of the first panel are arranged as the first bulk layer 71, and at least one layer of the continuous fiber-reinforced thermoplastic material at an outer side of the second panel are arranged as the second bulk layer 71. One layer of the hot-melting connecting film at an inner side of the first panel forms a first interface layer 72, and one layer of the hot-melting connecting film at an inner side of the second panel forms a second interface layer 72.

(S62) The first interface layer is prepared on an inner surface of the first panel 73 by extrusion molding or thermal lamination, and the second interface layer is prepared on an inner surface of the second panel 73 by extrusion molding or thermal lamination. The first interface layer and the second interface layer are both made of a hot-melt binding film with a thickness of 0.01-0.5.

(S63) At least two segments of the continuous honeycomb core material 110 with a certain width are connected via a connecting structure 113 to form a continuous honeycomb core material with the connecting structure 69. The continuous honeycomb core material, the first panel and the second panel are heated such that the upper and lower surfaces 69a of the continuous honeycomb core material, the first interface layer 72 and the second interface layer 72 respectively reach a preset melting temperature. The continuous honeycomb core material, the first panel and the second panel are subjected to heat-press compounding followed by cooling molding to obtain the honeycomb core sandwich composite panel.

In an embodiment, the above-mentioned preparation method further includes the following steps.

(S7) In the preparation process of the panel 73, the decorative layer 70 is hot-pressed and laminated in advance, or the upper and lower surfaces of the cooled honeycomb-core sandwich panel are hot-pressed and laminated with the decorative layer 70 twice. The decorative layer 70 is a second thermoplastic resin film with decorative appearance characteristics or fire and hot proof.

Embodiment 3

Figure 31:
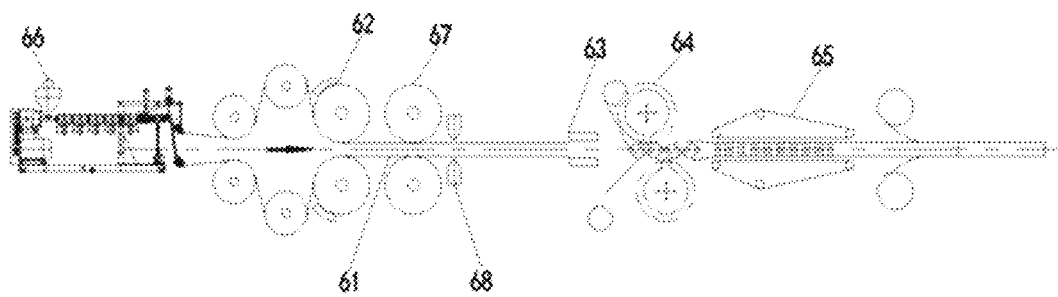
FIG. 31 is a schematic diagram of a device for preparing a continuous honeycomb core material according to an embodiment of the disclosure.
Figure 32:
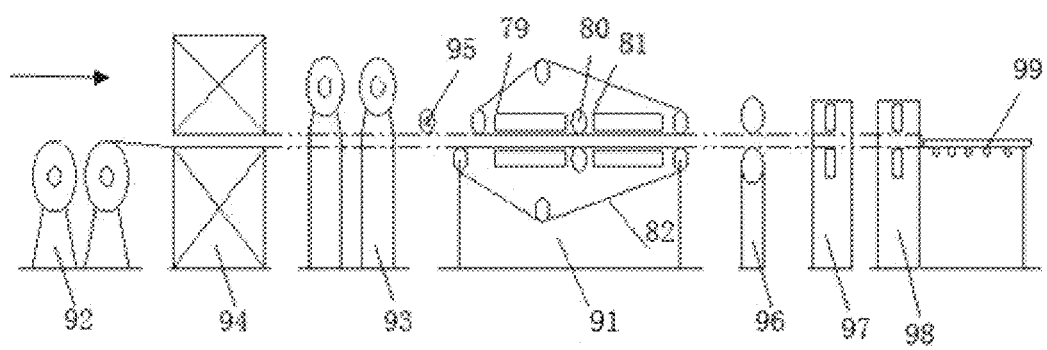
FIG. 32 is a schematic diagram of a device for preparing a honeycomb core composite panel according to an embodiment of the disclosure.

As shown in FIG. 31 and FIG. 32, a device provided herein for preparing the honeycomb-core sandwich composite panels includes a first conveyor belt unit 61, a thermoforming device 62, a cutting device 63, a dividing double-roller device 64, a first cooling unit 68, a hot melt device 65, a hot-pressing laminating device 91, a first unreeling mechanism 92, a second unreeling mechanism 93, a delivery mechanism 94, a pushing mechanism 95, a longitudinal cutting device 97 and a second cutting device 98.

The first conveyor belt unit 61 is configured to realize the continuous transport during the preparation of the honeycomb core sandwich composite board from the thermoplastic resin film.

The thermoforming device 62 is configured for thermoforming of the thermoplastic resin film. The thermoforming device 62 includes an upper forming mold and a lower forming mold. Two layers of the thermoplastic resin film are respectively placed into the upper and the lower forming mold, and subjected to thermal molding or vacuum plastic-absorbing thermoforming to form two sheet structures that are continuous along a longitudinal direction and consist of a plurality of semi-hexagonal structures consecutively connected along a transverse direction. Each of the two sheet structures includes a plurality of semi-hexagonal units arranged arranged spaced apart. An engagement portion 41 between adjacent semi-hexagonal units, a first sub connecting portion 42 and a second sub connecting portion 43 respectively arranged on two side edges. The two sheet structures respectively enter engaging parts of the upper forming mold and the lower forming mold. the engagement portions of the two sheet structures are pressed via a roller pressure formed by setting a gap between the engaging parts of the upper and lower forming molds to form the core board that is continuous along longitudinal direction and is formed by a plurality of hexagonal columns consecutively connected along a transverse direction and is formed by a plurality of hexagonal columns consecutively connected along a transverse direction, and two transverse edges of the core board are respectively provided with a first connecting portion 111 and a second connecting portion 112 The outer side of the core board is an adhesive layer 212, and the inner layer of the core board is a support layer 212.

The first cooling device 68 is configured to cool the core board, and can be an air-cooling device.

The cutting device 63 is configured to cut the core board cooled by the first cooling device. The cooled core board is cut up and down at intervals via the cutting device 63 to form notches that are spaced up and down and partially connected. The cutting device 63 can be used for cutting through the metal or non-metallic blade cutting, laser cutting, high-pressure hydraulic cutting, wire cutting, resistance wire cutting, or plasma cutting, etc.

The dividing double-roller device 64 is configured to fold the core board with notches to form continuous cells connected side-by-side in back and forth and provides a pushing pressure required for the connection of side walls. The dividing double-roller device 64 includes a set of rollers with dividing teeth, which put the pressure on the cut with the thickness of continuous honeycomb core material as the dividing base, and by setting the difference between the speed of the first conveyor belt device 61 on the dividing double-roller device 64 and the speed of the split wheel line, to fold and rotate the horizontal unit after being cut about 90° to form continuous units connected side-by-side back and forth. The degree folding requirements for honeycomb cores with different cut spacing and different hexagonal cross-sectional size can be realized through the setting of the teeth of the dividing double-roller device and the roller in the centers of the horizontal direction and the vertical direction.

The hot melting device 65 is configured to heat the core board fold by the dividing double-roller device 64. The hot melting device 65 heats the folded cells connected side by side achieve hot melting connection of adjacent side walls of between cells to obtain the continuous honeycomb core material 110. The heating temperature can be controlled between the melting point of the adhesive layer 212 of the sidewall and the softening point of the support layer 211, thus obtaining the fitting strength between the adjacent sidewalls, and increasing the pressure strength of the continuous honeycomb core material 110 without changing the geometry of the unit.

The first unreeling mechanism 92 is configured to unreel a reeled first panel 73, and the second unreeling mechanism 93 is configured to unreel a reeled second panel.

The device provided herein for preparing the honeycomb-core sandwich composite panels in an embodiment, further including a second cutting device, the delivery mechanism 94, the pushing mechanism 95, and the hot pressing laminating device 91.

The second cutting device is configured to transversely cut the honeycomb core into a plurality of honeycomb core according to a preset length, which may be the persistent cutting, the infrared cutting, or the laser cutting, but is not limited to those stated herein.

The delivery mechanism 94 is configured to orderly convey the honeycomb core segments to a preset position.

The pushing mechanism 95 is configured to push the connection structure to realize connection between at least two adjacent honeycomb core segments to form the continuous honeycomb core material.

The hot press laminating device 91 is configured to realize hot press lamination between an upper surface of the continuous honeycomb-core material and the first panel and hot press lamination between a lower surface 69*a* of the continuous honeycomb-core material and the second panel to form the honeycomb core sandwich composite panel. The hot press laminating device 91 includes a heating device 79, a hot press laminating roll 80, a second cooling device 81 and a second conveyor belt device 82.

The second conveyor belt device 82 is configured to realize the continuous transmission during the processes for preparing the honeycomb-core sandwich composite panel from the continuous honeycomb core material with the connecting structure, which is not only resistant to a high temperature but also resistant to hot-melt adhesive bonding. The second conveyor belt device 82 can be a double-sided steel belt or a double-sided high-temperature resistant Teflon belt but is not limited to those stated herein.

The heating device 79 includes an upper and a lower contact heat conduction heating device, respectively heating on the upper and lower panel 73. The heat from the heating device passes through the outer bulk layer 71 of the panel 73 to the interface layer through the heat-transfer path from outside to inside to heat the interface layer at the set temperature to form the hot-melt connection layer via the heat transferring mixed by the heat conduction and the heat convection.

One or more sets of the hot-pressing composite roll 80 are configured to combine the interface layer 72 of the panel 73 and the upper and lower surfaces 69*a* of the continuous honeycomb-core material with the connecting structure via the hot pressing.

The second cooling device 81 includes an upper and a lower contact cooling device, which is configured to cool and form the honeycomb core sandwich composite panel that is hot-pressed by the hot-pressing laminating roll.

The device provided herein for preparing the honeycomb-core sandwich composite panels further includes a packaging device configured to perform stacked packaging on the honeycomb core segments with a certain width.

The device provided herein for preparing the honeycomb-core sandwich composite panels further includes a longitudinal cutting device 97 configured to longitudinally trim the two longitudinal sides of the honeycomb core sandwich composite panel.

The device provided herein for preparing the honeycomb-core sandwich composite panels further includes a second cutting device 98 configured to transversely cut the honeycomb-core sandwich composite panel according to a preset length. The second cutting device can be the embedded cutting, the infrared cutting, or the laser cutting, but is not limited to those stated herein.

The device provided herein for preparing the honeycomb-core sandwich composite panel further includes an extrusion device configured to extrude the thermoplastic resin film used as the raw material.

The device provided herein for preparing the honeycomb-core sandwich composite panel further includes a pressing device 67 configured to combine two sheet structures that are continuous along the longitudinal direction and are formed by a plurality of semi-hexagonal structures consecutively connected along a transverse direction into the core board that is continuous along a longitudinal direction and is formed by a plurality of hexagonal columns consecutively connected along a transverse direction, and provided with the first connecting portion and the second connecting portion on the two edge sides.

The device provided herein for preparing the honeycomb core sandwich composite panel further includes a traction mechanism 96 configured to pull the honeycomb core sandwich composite panel.

The device provided herein for preparing the honeycomb-core sandwich composite panels further includes a landing device 99 configured to automatically stack the honeycomb-core sandwich composite panels cut by the longitudinal cutting device 97 and the second cutting device 98.

In an embodiment, the operations of the device provided herein for preparing the honeycomb-core sandwich composite panel are described below.

Two thermoplastic resin films with the two-layer structure are extruded by the extrusion device 66. The two layers of the thermoplastic resin film are the adhesive layer 212 and the support layer 211 in sequence. The melting point of adhesive layer 212 is less than the softening point of the support layer 211. The two layers of the thermoplastic resin film are respectively placed into the upper and the lower forming mold, followed by the heating molding process or heating vacuum blister molding process to form two sheet structures that are continuous along the longitudinal direction and are formed by a plurality of semi-hexagonal structures consecutively connected along a transverse direction. The plurality of consecutively connected semi hexagonal structure includes a plurality of semi-hexagonal units 40 arranged spaced apart, an engagement portion 41 between adjacent semi-hexagonal units, a first sub connecting portion 42 and a second sub connecting portion 43 respectively arranged on two side edges. The two sheet structures respectively enter engaging parts of the upper forming mold and the lower forming mold; the engagement portions of the two sheet structures are pressed via a roller pressure formed by setting a gap between the engaging parts of the upper and lower forming molds to form the core board that is continuous along longitudinal direction and is formed by a plurality of hexagonal columns consecutively connected along a transverse direction, and two transverse edges of the core board are respectively provided with a first connecting portion 111 and a second connecting portion 112. The core board is cooled via the first cooling device 68 and then transferred to the cutting device 63 to be cut. The core board is cut up and down at intervals via the cutting device 63 to form notches that are spaced apart up and down and partially connected. During the cutting, the core board is not completely cut off, and the connecting edge is retained at the notch. After the cutting, the core board device is transferred to the dividing double-roller device 64 by the first conveyor belt 61, the roller with dividing teeth in the dividing double-roller device 64 puts pressure on the cut. The core board with notches is rotated by positive or negative 90° in a direction of the notches to fold the core board with the notches position as a folding position and the connecting edge at the notches as a folding rotating axis to form continuous cells connected side by side in back and forth. Then, the continuous units are conveyed by the first conveyor belt device 61 to the hot melting device 65, the hot melting device 65 can heat the cells connected side by side, and the heating temperature is controlled between the melting point of the adhesive layer 212 and the softening point of the support layer 211, so that the adjacent sidewalls 2 between the cells are connected by the hot melting, forming the continuous honeycomb core material 110. The continuous honeycomb core materials 110 are cut by the first cutting device to form a plurality of the continuous honeycomb core material 110 segments with a certain width. The first unreeling mechanism 92 continuously conveys the lower panel, the second unreeling mechanism 93 continuously conveys the upper panel, the upper and the lower panel 73, and the continuous honeycomb core materials 110 with a certain or the same width are conveyed by the third conveyor belt device into the hot-pressing composite device 91, before entering the hot-pressing composite device 91, at least two adjacent continuous honeycomb core materials 110 are pushed by the pushing mechanism 95 to form the continuous honeycomb core material with the connecting structure 69. The heating device 79 heats the upper and lower panel 73. The heat from the heating device passes through the outer bulk layer 71 of the panel 73 to the interface layer through the heat-transfer path from outside to inside to heat the interface layer between the upper and the lower surfaces of the continuous honeycomb-core material with the connecting structure 69 and the panel 73 at the set temperature via the heat transferring mixed by the heat conduction and the heat convection, followed by the hot-pressing process, namely the interface layer 72 between the upper and lower panel 73 and the continuous honeycomb-core material with the connecting structure are conveyed via the second conveyor device 82 and are hot-pressed via at least a set of hot-pressing composite roll 80, and then are conveyed by the second conveyer belt device 82 to the second cooling unit 81. After the cooling process, the continuous processes for producing the honeycomb core sandwich composite panels are completed. The honeycomb core sandwich composite panel is pulled by the traction mechanism 96 into the longitudinal cutting device 97 and is longitudinally trimmed by the longitudinal cutting unit 97. Then the trimmed honeycomb core sandwich composite panel is transferred to the second cutting device 98 and is transversely cut by the second cutting device 98 to form the ultimate honeycomb-core sandwich composite panel.

In conclusion, the honeycomb core material provided in the present invention is provided with a first connecting portion and a second connecting portion on two transverse sides, and the first connecting portion of one of adjacent two honeycomb cores and the second connecting portion of the other of the adjacent two honeycomb cores fit each other to form a connecting structure, which can further prepare the continuous honeycomb core sandwich panel with arbitrary width and length, and improve the bending strength of the honeycomb core sandwich composite panel.

It should be declared that the related terms in this invention, such as "first" and "second", are only used to distinguish one entity or operation from another entity or operation, and do not necessarily require or imply any such actual relationship or order between the entities or operations. Moreover, the terms "including", "include" or any of those other variants are intended to cover a non-exclusive contain, thereby those items or equipment including a series of elements include not only those elements, but also other elements not explicitly listed, or inherent elements for those items or equipment.

Described above are merely preferred embodiments of the disclosure, which are not intended to limit the disclosure. Any variations, modifications and replacements made by those skilled in the art without departing from the spirit of the disclosure should fall within the scope of the disclosure defined by the appended claims.

What is claimed is:

1. A continuous honeycomb core material, comprising:
   a plurality of honeycomb cores;
   wherein each of the plurality of honeycomb cores comprises a plurality of cells arranged in rows; each of the plurality of cells is a hexagonal column formed by side walls; each of the side walls comprises a support layer and an adhesive layer; the support layer and the adhesive layer are made of different materials, and a melting point of the adhesive layer is lower than a softening point of the support layer; adjacent cells along a transverse direction are connected by a connecting wall arranged transversely; and adjacent side walls of adjacent cells along a longitudinal direction are attached to each other through adhesive layers; and
   edges of two transverse sides of each of the plurality of honeycomb cores are provided with a first connecting portion and a second connecting portion;
   wherein the first connecting portion of one of adjacent two honeycomb cores and the second connecting portion of the other of the adjacent two honeycomb cores are staggeredly engaged to form a connecting structure with a quadrilateral cross section; or the first connecting portion of one of adjacent two honeycomb cores and the second connecting portion of the other of the adjacent two honeycomb cores fit each other to form a connecting structure with a trapezoidal cross section, wherein the first connecting portion has an inward-splayed cross section, and the second connecting portion has an outward-splayed cross section; or the first connecting portion of one of adjacent two honeycomb cores and the second connecting portion of the other of the adjacent two honeycomb cores fit each other to form a connecting structure with a cross-shaped cross section, wherein the first connecting portion and the second connecting portion both have a T-shaped cross section; or the first connecting portion of one of adjacent two honeycomb cores is inserted into the second connecting portion of the other of the adjacent two honeycomb cores to form a connecting structure with a quadrilateral cross section, wherein the first connecting portion is engaged in a groove formed by the second connecting portion to enable connection between the adjacent two honeycomb cores, and the first connecting portion has an inward-splayed cross section; or the first connecting portion of one of adjacent two honeycomb cores is inserted into the second connecting portion of the other of the adjacent two honeycomb cores to form a connecting structure with a pentagonal cross section, wherein the first connecting portion has a pentagonal cross section with an opening, and a cross section of the second connecting portion is T-shaped.

2. The continuous honeycomb core material of claim 1, wherein a shape of the first connecting portion is the same as that of the second connecting portion.

3. The continuous honeycomb core material of claim 1, wherein a shape of the first connecting portion is different from that of the second connecting portion.

4. The continuous honeycomb core material of claim 1, wherein the side walls of each of plurality of cells have a three-layered structure consisting of the support layer and two adhesive layers, and the two adhesive layers are respectively provided at two sides of the support layer.

5. A honeycomb core sandwich composite panel, comprising:
the continuous honeycomb core material of claim 1;
a first panel arranged on an upper surface of the continuous honeycomb core material; and
a second panel arranged on a lower surface of the continuous honeycomb core material;
wherein the first panel comprises a first bulk layer and a first interface layer; the first bulk layer is arranged on the first interface layer; the first interface layer is bonded to the upper surface of the continuous honeycomb core material; the second panel comprises a second bulk layer and a second interface layer; the second interface layer is bonded to the lower surface of the continuous honeycomb core material; the second bulk layer is arranged on the second interface layer; the first bulk layer, the second bulk layer, the first interface layer and the second interface layer are independently made of a continuous fiber-reinforced thermoplastic material.

6. A method of preparing the honeycomb core sandwich composite panel of claim 5, comprising:

(S1) processing a first thermoplastic resin film via a thermal molding process or a vacuum plastic-absorbing thermoforming process to obtain a sheet structure, wherein the sheet structure is continuous along a longitudinal direction and is formed by a plurality of semi-hexagonal structures consecutively connected along a transverse direction; and the sheet structure comprises a plurality of semi-hexagonal units arranged spaced apart, an engagement portion between adjacent semi-hexagonal units, a first sub connecting portion and a second sub connecting portion respectively arranged on two side edges;

(S2) aligning and bonding engagement portions of two sheet structures via a thermal pressing process or an ultrasonic thermal welding process to form a core board, wherein the core board is continuous along a longitudinal direction and is formed by a plurality of hexagonal columns consecutively connected along a transverse direction, and two transverse edges of the core board are respectively provided with a first connecting portion and a second connecting portion;

(S3) cutting the core board up and down at intervals to form notches; wherein the notches are spaced apart up and down and are partially connected; and during the cutting, the core board is not completely cut off, and a connecting edge is retained at the notches;

(S4) rotating the core board with notches by positive or negative 90 degrees in a direction of the notches to fold the core board with the notches as a folding position and the connecting edge at the notches as a folding rotation axis; and heating adjacent side walls to allow the adhesive layer to be in a melted state; and bonding the adjacent side walls to form a honeycomb core;

(S5) transversely cutting the honeycomb core according to a preset length to prepare a plurality of honeycomb core segments with a certain width; and (S6) connecting at least two honeycomb core segments with a certain width via a connecting structure to form a continuous honeycomb core material with the connecting structure; heating the continuous honeycomb core material, the first panel and the second panel such that the upper and lower surfaces of the continuous honeycomb core material, the first interface layer and the second interface layer respectively reach a preset melting temperature; and subjecting the continuous honeycomb core material, the first panel and the second panel to heat-press compounding followed by cooling molding to obtain the honeycomb core sandwich composite panel.

7. The method of claim 6, wherein the first thermoplastic resin film comprises the support layer and the adhesive layer, and the support layer and the adhesive layer are made of different materials; a melting point of the adhesive layer is lower than a softening point of the support layer; an outer side of the core board in step (S2) is provided with the adhesive layer; and in step (S4), adhesive layers of side walls of cells connected side by side after the folding are bound by hot-melting, and a heating temperature of the hot-melting is between the melting point of the adhesive layer and the softening point of the support layer.

8. The method of claim 6, wherein the first thermoplastic resin film has a single-layer structure; in step (S1), the first thermoplastic resin film with the single-layer structure is configured as the support layer, and two layers of a second thermoplastic resin film are respectively bound to two sides of the support layer as the adhesive layer by heat-press compounding; a melting point of the adhesive layer is lower than a softening point of the support layer; and in step (S4), adhesive layers of side walls of cells connected side by side after the folding are bound by hot-melting, and a heating temperature of the hot-melting is between the melting point of the adhesive layer and the softening point of the support layer.

9. The method of claim 6, wherein the step (S6) is performed through steps of:
   (S61) arranging at least one layer of the continuous fiber-reinforced thermoplastic material at an outer side of the first panel as the first bulk layer; and arranging at least one layer of the continuous fiber-reinforced thermoplastic material at an outer side of the second panel as the second bulk layer;
   (S62) preparing the first interface layer on an inner surface of the first panel by extrusion molding or thermal lamination, and preparing the second interface layer on an inner surface of the second panel by extrusion molding or thermal lamination, wherein the first interface layer and the second interface layer are both made of a hot-melt binding film with a thickness of 0.01-0.5 mm; and
   (S63) connecting at least two honeycomb core segments with a certain width via the connecting structure to form the continuous honeycomb core material with the connecting structure; heating the continuous honeycomb core material, the first panel and the second panel such that the upper and lower surfaces of the continuous honeycomb core material, the first interface layer and the second interface layer respectively reach a preset melting temperature; and subjecting the continuous honeycomb core material, the first panel and the second panel to heat-press compounding followed by cooling molding to obtain the honeycomb-core sandwich composite panel.

10. The method of claim 6, further comprising:
    (S7) binding a decorative layer to the first panel and the second panel in advance by hot-press lamination, or binding the decorative layer to upper and lower surfaces of the honeycomb-core sandwich composite panel by hot press lamination;
    wherein the decorative layer is a second thermoplastic resin film with decorative appearance.

11. A device for implementing the method of claim 6, comprising:
    a first conveyor belt unit;
    a thermoforming device;
    a first cutting device;
    a dividing double-roller device;
    a first cooling unit;
    a hot melting device;
    a hot-press laminating device;
    a first unreeling mechanism;
    a second unreeling mechanism;
    a delivery mechanism;
    a pushing mechanism; and
    a second cutting device;
    wherein the first conveyor belt unit is configured to realize continuous transport during the preparation of the honeycomb core sandwich composite board from the thermoplastic resin film;
    the thermoforming device is configured for thermoforming of the thermoplastic resin film; wherein the thermoforming device comprises an upper forming mold and a lower forming mold; two layers of the thermoplastic resin film are respectively placed in the upper forming mold and the lower forming mold, and subjected to thermal molding or vacuum plastic-absorbing thermoforming to form two sheet structures that are continuous along a longitudinal direction and consist of a plurality of semi-hexagonal structures consecutively connected along a transverse direction; each of the two sheet structures comprises a plurality of semi-hexagonal units arranged spaced apart, an engagement portion between adjacent semi-hexagonal units, a first sub connecting portion and a second sub connecting portion respectively arranged on two side edges; the two sheet structures respectively enter engaging parts of the upper forming mold and the lower forming mold; the engagement portions of the two sheet structures are pressed via a roller pressure formed by setting a gap between the engaging parts of the upper and lower forming molds to form the core board that is continuous along longitudinal direction and is formed by a plurality of hexagonal columns consecutively connected along a transverse direction, and two transverse edges of the core board are respectively provided with a first connecting portion and a second connecting portion;
    the first cooling device is configured to cool the core board;
    the first cutting device is configured to cut the core board cooled by the first cooling device up and down at interval to form notches, and the notches are spaced apart up and down and are partially connected;
    the dividing double-roller device is configured to fold the core board with notches to form continuous cells connected side by side in back and forth and provide a pushing pressure required for connection of side walls;
    the hot melting device is configured to heat the cells connected side by side to achieve hot melting connection of adjacent side walls of between cells to obtain the honeycomb core; and
    the first unreeling mechanism is configured to unreel a reeled first panel; and the second unreeling mechanism is configured to unreel a reeled second panel;
    the second cutting device is configured to transversely cut the honeycomb core into a plurality of honeycomb core segments according to a preset length;
    the delivery mechanism is configured to orderly convey the honeycomb core segments to a preset position;
    the pushing mechanism is configured to push the connection structure to realize connection between at least two adjacent honeycomb core segments to form the continuous honeycomb core material; and
    the hot press laminating device is configured to realize hot press lamination between an upper surface of the continuous honeycomb core material and the first panel and hot press lamination between a lower surface of the continuous honeycomb-core material and the second panel to form the honeycomb-core sandwich composite panel, and the hot press laminating device comprises a heating device, a hot press laminating roll, a second cooling device and a second conveyor belt device.

12. The device of claim 11, wherein the device further comprises a packaging device configured to perform stacked packaging on the honeycomb core segments with a certain width.

13. The device of claim 11, wherein the device further comprises a longitudinal cutting device configured to longitudinally trim two longitudinal sides of the honeycomb core sandwich composite panel.

14. The device of claim 11, wherein the device further comprises a third cutting device configured to transversely cut the honeycomb core sandwich composite panel according to a preset length.

\* \* \* \* \*